US012646064B2

(12) United States Patent (10) Patent No.: US 12,646,064 B2
Sato et al. (45) Date of Patent: Jun. 2, 2026

(54) DISTRIBUTED LEDGER SYSTEM AND CONTROL METHOD FOR DISTRIBUTED LEDGER SYSTEM

(71) Applicant: Hitachi, Ltd., Tokyo (JP)

(72) Inventors: Tatsuya Sato, Tokyo (JP); Taku Shimosawa, Tokyo (JP); Satoshi Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 188 days.

(21) Appl. No.: 18/599,316

(22) Filed: Mar. 8, 2024

(65) Prior Publication Data

US 2024/0420135 A1 Dec. 19, 2024

(30) Foreign Application Priority Data

Jun. 14, 2023 (JP) ................................. 2023-097435

(51) Int. Cl.
G06Q 20/40 (2012.01)
G06Q 20/02 (2012.01)
(Continued)

(52) U.S. Cl.
CPC ........... G06Q 20/401 (2013.01); G06Q 20/02 (2013.01); H04L 9/50 (2022.05); H04L 63/1408 (2013.01); H04L 43/02 (2013.01); H04L 43/065 (2013.01)

(58) Field of Classification Search
None
See application file for complete search history.

(56) References Cited

U.S. PATENT DOCUMENTS 10,831,530 B2 * 11/2020 De Caro .............. G06Q 20/223
11,151,122 B2 * 10/2021 Sato .................... G06F 16/2379
(Continued)

FOREIGN PATENT DOCUMENTS

JP 2021-526751 A 10/2021

OTHER PUBLICATIONS

Satoshi Nakamoto, et al., Bitcoin: A Peer-to-Peer Electronic Cash System, retrieved May 26, 2023, <URL : https://bitcoin.org/bitcoin.pdf>.

(Continued)

*Primary Examiner* — Lashonda Jacobs-Burton
(74) *Attorney, Agent, or Firm* — MATTINGLY & MALUR, PC

(57) ABSTRACT

A distributed ledger system is constructed by communicably connecting distributed ledger nodes that each of a plurality of organizations has, and is capable of executing a smart contract. The smart contract manages information in a distributed ledger while building consensus among the distributed ledger nodes of the plurality of organizations. The distributed ledger node executes the smart contract according to a transaction received from another device, such as a client node of an organization. The smart contract receives a soundness monitoring result that is information acquired by a first organization monitoring soundness of the distributed ledger node of a second organization, verifies the soundness of the distributed ledger node of the second organization by verifying the received soundness monitoring result, and records a soundness verification result that is a result of verifying the soundness, in the distributed ledger.

13 Claims, 26 Drawing Sheets

(51) Int. Cl.
| | |
|---|---|
| _H04L 9/00_ | (2022.01) |
| _H04L 9/40_ | (2022.01) |
| _H04L 43/02_ | (2022.01) |
| _H04L 43/065_ | (2022.01) |

(56) References Cited

U.S. PATENT DOCUMENTS

| | | | | |
|---|---|---|---|---|
| 11,283,673 | B2 * | 3/2022 | Kawahara | H04L 9/0637 |
| 11,621,850 | B2 * | 4/2023 | Nishijima | H04L 9/3239 |
| | | | | 713/168 |
| 11,860,822 | B2 * | 1/2024 | Wood | G06Q 20/3678 |
| 2018/0121909 | A1 * | 5/2018 | Christidis | H04L 9/3236 |
| 2019/0332702 | A1 * | 10/2019 | Manamohan | G06F 11/3006 |
| 2019/0354968 | A1 * | 11/2019 | Sato | G06Q 20/3825 |
| 2020/0311051 | A1 * | 10/2020 | Sato | G06F 16/9024 |
| 2021/0304120 | A1 * | 9/2021 | Hill | G06F 16/27 |
| 2022/0029813 | A1 * | 1/2022 | Wakabayashi | H04L 9/0618 |

OTHER PUBLICATIONS

Ethereum White Paper, retrieved May 26, 2023, <URL : https://ethereum.org/ja/whitepaper/>.
Hyperledger-fabricdocs Documentation, Sep. 30, 2020, retrieved May 26, 2023, Internet hyperledger-fabric.readthedocs.io/en/release-2.5, <URL : http://hyperledgerfabric.readthedocs.io/en/release-2.5/>.

* cited by examiner

DISTRIBUTED LEDGER SYSTEM

BLOCKCHAIN (BC)    311

311a

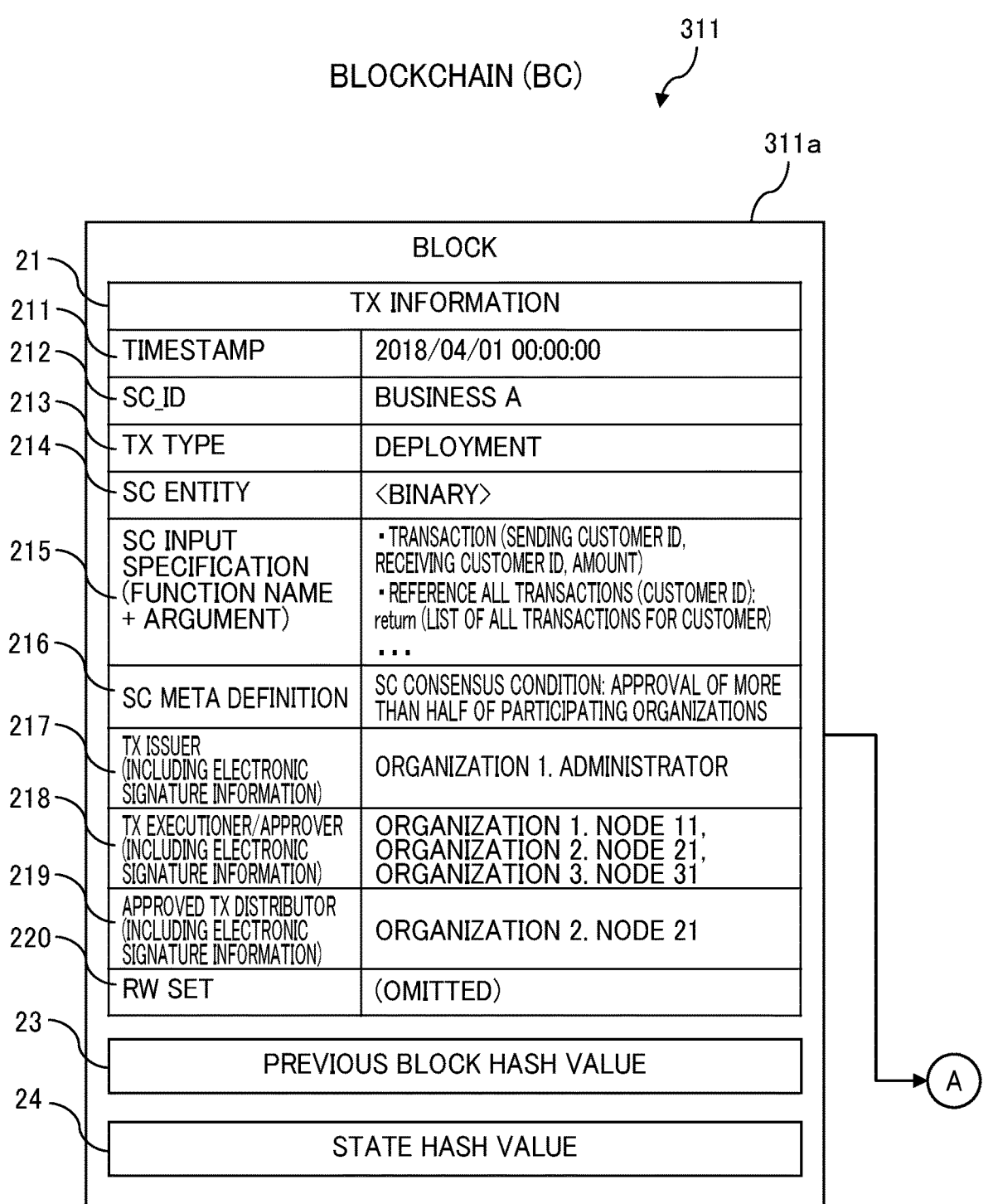

| BLOCK | |
|---|---|
| 21 — TX INFORMATION | |
| 212 — TIMESTAMP | 2018/04/01 00:00:00 |
| 213 — SC_ID | BUSINESS A |
| 214 — TX TYPE | DEPLOYMENT |
| SC ENTITY | \<BINARY\> |
| 215 — SC INPUT SPECIFICATION (FUNCTION NAME + ARGUMENT) | • TRANSACTION (SENDING CUSTOMER ID, RECEIVING CUSTOMER ID, AMOUNT) • REFERENCE ALL TRANSACTIONS (CUSTOMER ID); return (LIST OF ALL TRANSACTIONS FOR CUSTOMER) ... |
| 216 — SC META DEFINITION | SC CONSENSUS CONDITION: APPROVAL OF MORE THAN HALF OF PARTICIPATING ORGANIZATIONS |
| 217 — TX ISSUER (INCLUDING ELECTRONIC SIGNATURE INFORMATION) | ORGANIZATION 1. ADMINISTRATOR |
| 218 — TX EXECUTIONER/APPROVER (INCLUDING ELECTRONIC SIGNATURE INFORMATION) | ORGANIZATION 1. NODE 11, ORGANIZATION 2. NODE 21, ORGANIZATION 3. NODE 31 |
| 219 — APPROVED TX DISTRIBUTOR (INCLUDING ELECTRONIC SIGNATURE INFORMATION) | ORGANIZATION 2. NODE 21 |
| 220 — RW SET | (OMITTED) |
| 23 — PREVIOUS BLOCK HASH VALUE | |
| 24 — STATE HASH VALUE | |

BLOCKCHAIN (BC)

(CONTINUED FROM FIG. 2A)

BLOCKCHAIN (BC)
(CONTINUED FROM FIG. 2B)

311

311c

BLOCKCHAIN (BC)

(CONTINUED FROM FIG. 2C)

311

BLOCKCHAIN (BC)

(CONTINUED FROM FIG. 2E)

311

311f

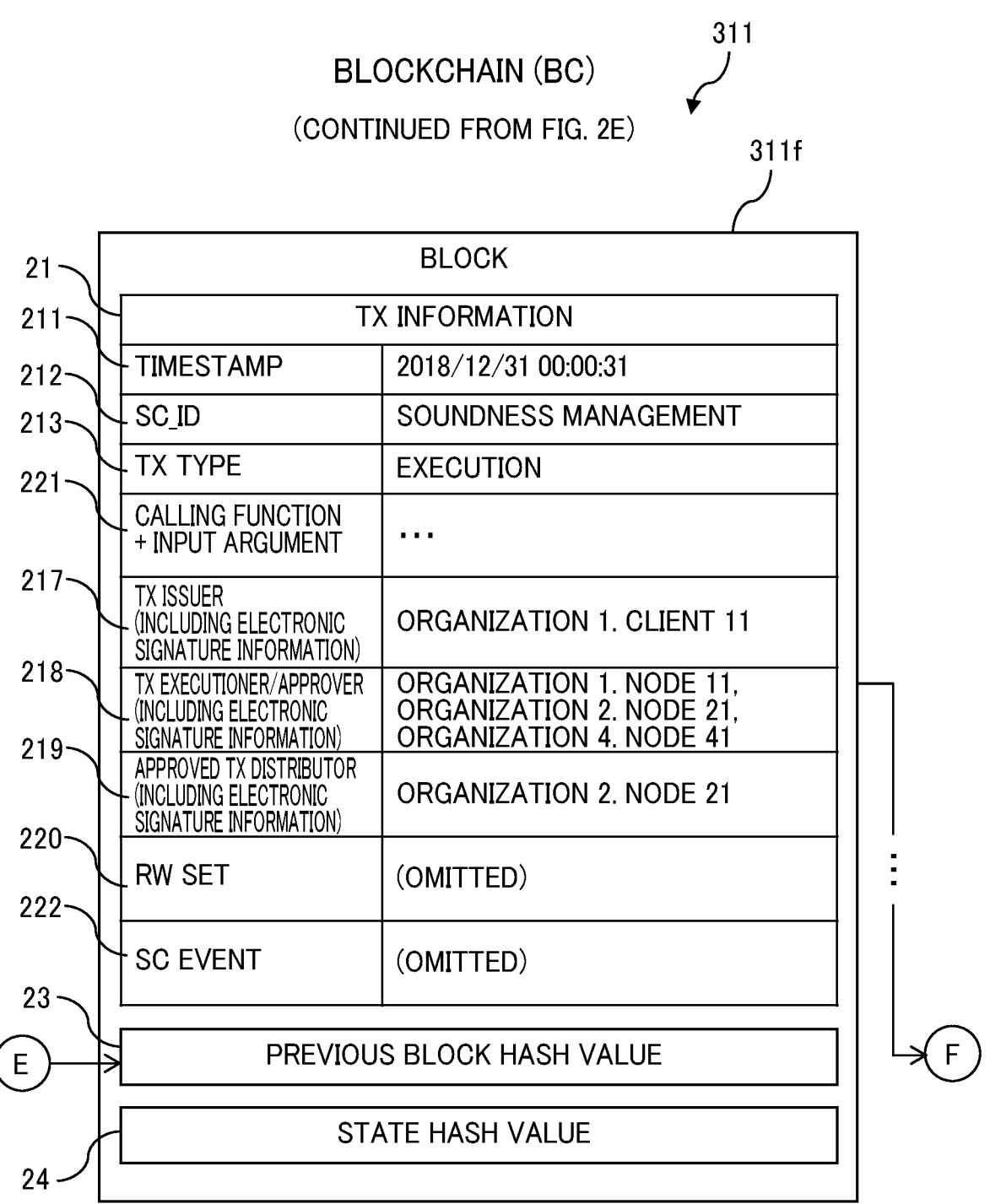

| BLOCK | | |
|---|---|---|
| TX INFORMATION | | |
| TIMESTAMP | 2018/12/31 00:00:31 | |
| SC_ID | SOUNDNESS MANAGEMENT | |
| TX TYPE | EXECUTION | |
| CALLING FUNCTION + INPUT ARGUMENT | · · · | |
| TX ISSUER (INCLUDING ELECTRONIC SIGNATURE INFORMATION) | ORGANIZATION 1. CLIENT 11 | |
| TX EXECUTIONER/APPROVER (INCLUDING ELECTRONIC SIGNATURE INFORMATION) | ORGANIZATION 1. NODE 11, ORGANIZATION 2. NODE 21, ORGANIZATION 4. NODE 41 | |
| APPROVED TX DISTRIBUTOR (INCLUDING ELECTRONIC SIGNATURE INFORMATION) | ORGANIZATION 2. NODE 21 | |
| RW SET | (OMITTED) | |
| SC EVENT | (OMITTED) | |
| PREVIOUS BLOCK HASH VALUE | | |
| STATE HASH VALUE | | |

BLOCKCHAIN (BC)

(CONTINUED FROM FIG. 2F)

311

311g

BLOCK

21

TX INFORMATION

23

F → PREVIOUS BLOCK HASH VALUE

STATE HASH VALUE

24

312

STATE INFORMATION

| SC_ID | SC ENTITY | INTERNAL TABLE |
|-------|-----------|----------------|
| 3121 | 3122 | 3123 |

| SC_ID | SC ENTITY | INTERNAL TABLE | |
|-------|-----------|----------------|---|
| BUSINESS A | ⟨BINARY⟩ | BALANCE STATE | 312a |

BALANCE STATE

| Key (CUSTOMER ID) | Value (BALANCE) | VERSION |
|-------------------|-----------------|---------|
| ... | ... | ... |
| CUSTOMER a | ¥99M | 5 |
| CUSTOMER b | ¥101M | 5 |
| ... | ... | ... |

TRANSACTION STATE

| Key (TRANSACTION ID) | Value (TRANSACTION DETAILS) | VERSION |
|----------------------|-----------------------------|---------|
| ... | ... | ... |
| TRANSACTION 200 | CUSTOMER a – ¥1M –⟩ CUSTOMER b. ESTABLISHED | 5 |
| ... | ... | ... |

| ... | ... | ... |
|-----|-----|-----|
| SOUNDNESS MANAGEMENT | ⟨BINARY⟩ | DETAILS DESCRIBED IN SEPARATE FIGURE |

ORGANIZATION INFORMATION
(CONSORTIUM INFORMATION)

302a

| 3021 | 3022 | 3023 | |
|---|---|---|---|
| BUSINESS ID | ORGANIZATION ID | MEMBER ID | · · · |
| BUSINESS A | ORGANIZATION 1 | ADMINISTRATOR 11 | · · · |
| BUSINESS A | ORGANIZATION 2 | ADMINISTRATOR 11 | · · · |
| BUSINESS A | ORGANIZATION 3 | ADMINISTRATOR 11 | · · · |
| · · · | · · · | · · · | · · · |
| BUSINESS A | ORGANIZATION 1 | DISTRIBUTED LEDGER NODE 11 | · · · |
| BUSINESS A | ORGANIZATION 2 | DISTRIBUTED LEDGER NODE 21 | · · · |
| BUSINESS A | ORGANIZATION 3 | DISTRIBUTED LEDGER NODE 31 | · · · |
| · · · | · · · | · · · | · · · |
| BUSINESS A | ORGANIZATION 1 | CLIENT NODE 11 | · · · |
| BUSINESS A | ORGANIZATION 2 | CLIENT NODE 21 | · · · |
| BUSINESS A | ORGANIZATION 3 | CLIENT NODE 31 | · · · |
| · · · | · · · | · · · | · · · |
| BUSINESS B | ORGANIZATION 1 | USER 11 | · · · |
| BUSINESS B | ORGANIZATION 2 | USER 11 | · · · |
| : | : | : | : |

FIG. 4A

SC CONSENSUS CONDITION INFORMATION
(CONSORTIUM INFORMATION)

302b

| BUSINESS ID | SC CONSENSUS CONDITION | ... |
|---|---|---|
| ... | ... | ... |
| BUSINESS A | APPROVAL OF MORE THAN HALF OF PARTICIPATING ORGANIZATIONS | ... |
| BUSINESS B | APPROVAL OF THREE ORGANIZATIONS OR MORE (2f + 1, f = 1) | ... |
| : | : | : |

SOUNDNESS MONITORING METHOD DEFINITION

| MONITORING METHOD ID | MONITORING METHOD | MONITORING FREQUENCY | DETERMINATION CRITERION | DETERMINATION METHOD | ... |
|---|---|---|---|---|---|
| ... | ... | ... | ... | ... | ... |
| MONITORING METHOD 01 | SERVICE DISCOVERY API | 60 SECONDS | SC CONSENSUS CONDITION | MAJORITY VOTE | ... |
| MONITORING METHOD 02 | TX EXECUTION TIME ACCORDING TO EXTERNAL MONITORING | 30 SECONDS | SC CONSENSUS CONDITION | OK IF AVERAGE VALUE < 3 SECONDS | ... |
| : | : | : | : | : | : |

SOUNDNESS MONITORING RESULT  552

| MONITORING ORGANIZATION ID | MONITORING TARGET | | MONITORING RESULT | MONITORING DATE AND TIME | TIME SPAN | ··· |
| | ORGANIZATION ID | DISTRIBUTED LEDGER NODE ID | | | | |
|---|---|---|---|---|---|---|
| ··· | ··· | ··· | ··· | ··· | ··· | ··· |
| ORGANIZATION 1 | ORGANIZATION 2 | NODE 1 | OK | (OMITTED):00:01 | Span1-1 | ··· |
| ORGANIZATION 1 | ORGANIZATION 2 | NODE 2 | NG | (OMITTED):00:01 | Span1-1 | ··· |
| ORGANIZATION 1 | ORGANIZATION 3 | NODE 1 | OK | (OMITTED):00:01 | Span1-1 | ··· |
| ORGANIZATION 1 | ORGANIZATION 3 | NODE 2 | OK | (OMITTED):00:01 | Span1-1 | ··· |
| ··· | ··· | ··· | ··· | ··· | ··· | ··· |
| ORGANIZATION 3 | ORGANIZATION 1 | NODE 1 | OK | (OMITTED):00:03 | Span1-1 | ··· |
| ORGANIZATION 3 | ORGANIZATION 1 | NODE 2 | OK | (OMITTED):00:03 | Span1-1 | ··· |
| ORGANIZATION 3 | ORGANIZATION 2 | NODE 1 | OK | (OMITTED):00:03 | Span1-1 | ··· |
| ORGANIZATION 3 | ORGANIZATION 2 | NODE 2 | NG | (OMITTED):00:03 | Span1-1 | ··· |
| ··· | ··· | ··· | ··· | ··· | ··· | ··· |
| ORGANIZATION 1 | ORGANIZATION 2 | NODE 1 | OK | (OMITTED):01:01 | Span1-2 | ··· |
| ORGANIZATION 1 | ORGANIZATION 2 | NODE 2 | NG | (OMITTED):01:01 | Span1-2 | ··· |
| ORGANIZATION 1 | ORGANIZATION 3 | NODE 1 | OK | (OMITTED):01:01 | Span1-2 | ··· |
| ORGANIZATION 1 | ORGANIZATION 3 | NODE 2 | OK | (OMITTED):01:01 | Span1-2 | ··· |
| : | : | : | : | : | : | : |

SOUNDNESS VERIFICATION RESULT

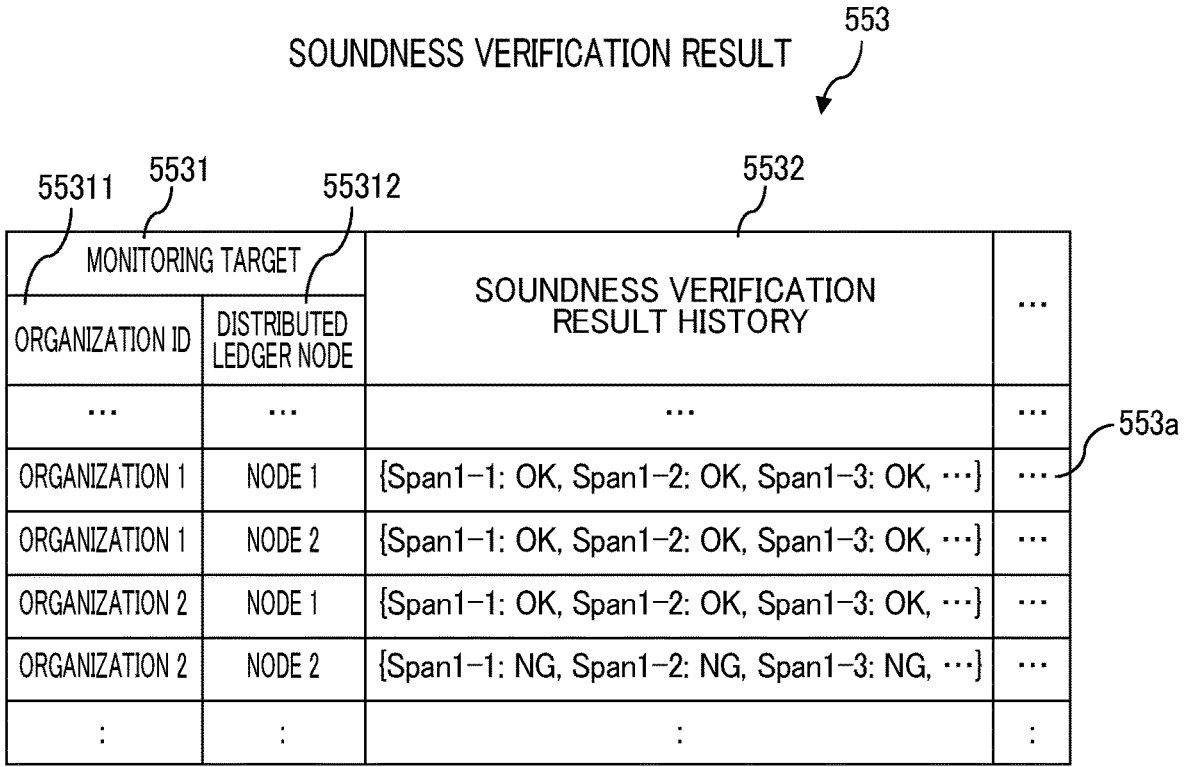

| MONITORING TARGET | | SOUNDNESS VERIFICATION RESULT HISTORY | ... |
| ORGANIZATION ID | DISTRIBUTED LEDGER NODE | | |
| --- | --- | --- | --- |
| ... | ... | ... | ... |
| ORGANIZATION 1 | NODE 1 | {Span1-1: OK, Span1-2: OK, Span1-3: OK, ···} | ... |
| ORGANIZATION 1 | NODE 2 | {Span1-1: OK, Span1-2: OK, Span1-3: OK, ···} | ... |
| ORGANIZATION 2 | NODE 1 | {Span1-1: OK, Span1-2: OK, Span1-3: OK, ···} | ... |
| ORGANIZATION 2 | NODE 2 | {Span1-1: NG, Span1-2: NG, Span1-3: NG, ···} | ... |
| : | : | : | : |

FIG. 6C

CONFIGURATION DESIGN INFORMATION

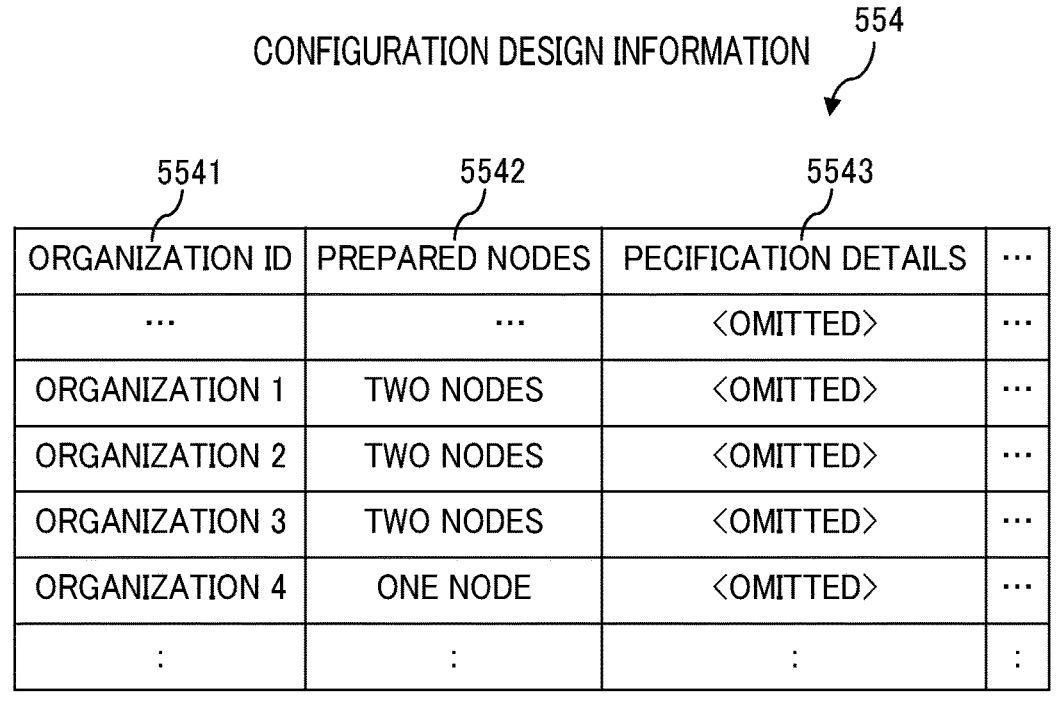

| ORGANIZATION ID | PREPARED NODES | PECIFICATION DETAILS | ... |
| --- | --- | --- | --- |
| ... | ... | <OMITTED> | ... |
| ORGANIZATION 1 | TWO NODES | <OMITTED> | ... |
| ORGANIZATION 2 | TWO NODES | <OMITTED> | ... |
| ORGANIZATION 3 | TWO NODES | <OMITTED> | ... |
| ORGANIZATION 4 | ONE NODE | <OMITTED> | ... |
| : | : | : | : |

FIG. 6D

CONFIGURATION COMPLIANCE STATUS 555

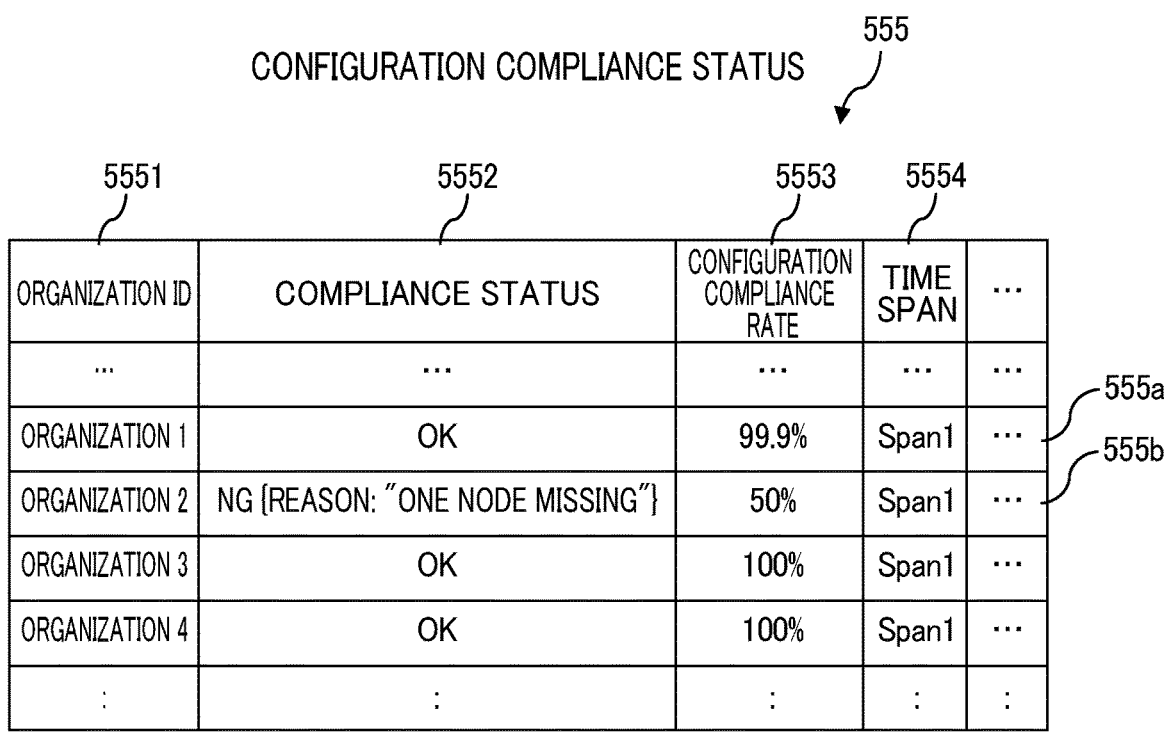

| ORGANIZATION ID | COMPLIANCE STATUS | CONFIGURATION COMPLIANCE RATE | TIME SPAN | ... |
|---|---|---|---|---|
| 5551 | 5552 | 5553 | 5554 | |
| ... | ... | ... | ... | ... |
| ORGANIZATION 1 | OK | 99.9% | Span1 | ... |
| ORGANIZATION 2 | NG [REASON: "ONE NODE MISSING"] | 50% | Span1 | ... |
| ORGANIZATION 3 | OK | 100% | Span1 | ... |
| ORGANIZATION 4 | OK | 100% | Span1 | ... |
| : | : | : | : | : |

CAPACITY INFORMATION 556

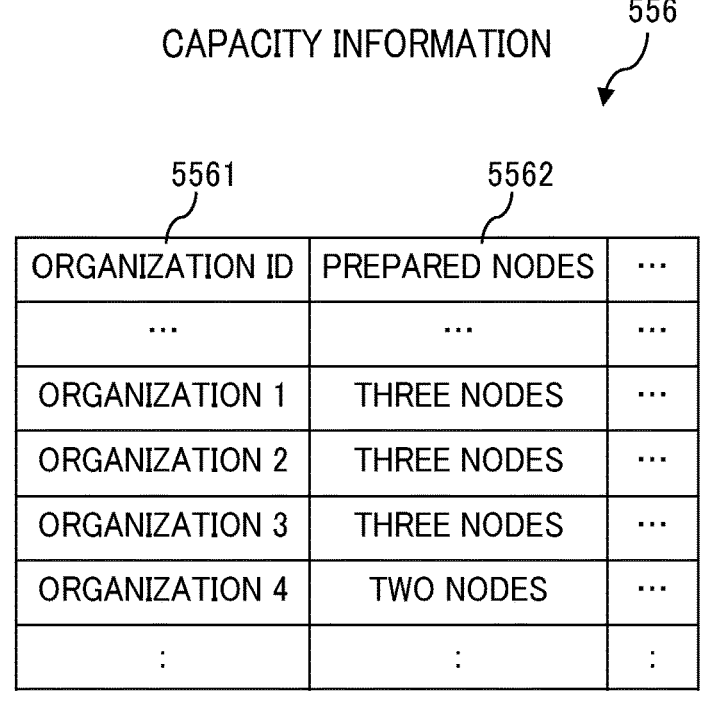

| ORGANIZATION ID | PREPARED NODES | ... |
|---|---|---|
| 5561 | 5562 | |
| ... | ... | ... |
| ORGANIZATION 1 | THREE NODES | ... |
| ORGANIZATION 2 | THREE NODES | ... |
| ORGANIZATION 3 | THREE NODES | ... |
| ORGANIZATION 4 | TWO NODES | ... |
| : | : | : |

FIG. 6F

ORGANIZATION RELIABILITY 557

| ORGANIZATION ID | SOUNDNESS REPORT CONTENT RELIABILITY | CONFIGURATION COMPLIANCE RELIABILITY | ... |
|---|---|---|---|
| ... | ... | ... | ... |
| ORGANIZATION 1 | 98% | 94% | ... |
| ORGANIZATION 2 | 90% | 70% | ... |
| ORGANIZATION 3 | 95% | 92% | ... |
| ORGANIZATION 4 | 99% | 99% | ... |
| : | : | : | : |

5571   5572   5573

MONITORING ORGANIZATION 558

| MONITORING ORGANIZATION ID | ... |
|---|---|
| ... | ... |
| ORGANIZATION 1, ORGANIZATION 3, ORGANIZATION 4 | ... |
| : | : |

5581

558a

MEMBER REGISTRATION PROCESS S700

SOUNDNESS REPORT PROCESS   S900

S1000

SOUNDNESS CROSS-
VERIFICATION PROCESS

MONITORING ORGANIZATION SELECTION PROCESS

S1300

1400

SOUNDNESS INFORMATION PROVIDING SCREEN

DISTRIBUTED LEDGER SYSTEM AND CONTROL METHOD FOR DISTRIBUTED LEDGER SYSTEM

CROSS-REFERENCE TO RELATED APPLICATION

The present application claims priority from Japanese application JP2023-097435, filed on Jun. 14, 2023, the content of which is hereby incorporated by reference into this application.

TECHNICAL FIELD

The present invention relates to a distributed ledger system and a method for controlling a distributed ledger system.

BACKGROUND ART

In recent years, technology (hereinafter referred to as "distributed ledger technology") has been developed that allows transactions that were previously conducted through centralized institutions such as financial institutions and governments to be performed directly between users by recording them on a distributed ledger (hereinafter also referred to as a "blockchain") managed by a P2P (Peer to Peer) network (hereinafter referred to as a "distributed ledger network") configured using individual user information processing devices, and application to various fields is progressing.

Regarding distributed ledger technology, for example, Patent Document 1 describes a system configured to enable endorsement of transactions in a blockchain in an optimized state. The above system identifies one or more endorsement requests to perform an endorsement, transmit the endorsement requests to an ordering node, monitors the performance indicators of the peers, and assigns one or more endorsement requests to the peers based on the performance indicators.

In addition, Non-Patent Document 1, for example, describes technology in which transactions that have been carried out via reliable centralized institutions such as financial institutions and governments can now be carried out directly between users using virtual currency using a distributed ledger.

Moreover, Non-Patent Document 2 and Non-Patent Document 3, for example, describe a Smart Contract (also called a "Chaincode"), which is a technology that updates a distributed ledger by executing predefined processing triggered by an event such as a transaction.

CITATION LIST

Patent Literature

Patent Document 1: JP 2021-526751 A

Non-Patent Literature

Non-Patent Document 1: "A Peer-to-Peer Electronic Cash System", [online], [retrieved May 26, 2023], Internet bitcoin.org/bitcoin.pdf
Non-Patent Document 2: "Ethereum White Paper", [online], [retrieved May 26, 2023], Internet ethereum.org/ja/whitepaper Non-Patent Document 3: "Hyperledger Fabric", [online], [retrieved May 26, 2023], Internet hyperledger-fabric-.readthedocs.io/en/release-2.5

SUMMARY OF INVENTION

Technical Problem

The above-described distributed ledger technology has the following characteristics:
(1) In transactions between participants in a distributed ledger network, transactions are finalized through consensus and approval by arbitrary or specific participants, rather than by a centralized institution.
(2) By managing a plurality of transactions as blocks, stringing the block together and recording the blocks in a distributed ledger and recording hash values in consecutive blocks, it is virtually impossible to tamper with the recorded contents.
(3) All participants share the same ledger data, and thus all participants may confirm the details of transactions.

In this way, distributed ledger technology eliminates the need for management by a centralized institution and makes it possible to share information and conduct transactions among multiple entities.

As usage forms of distributed ledger technology, there are public types that do not assume the existence of a specific administrator as described in Non-Patent Document 1, private types that assume the existence of a single administrator, and consortium types that assume the existence of multiple administrators as described in Non-Patent Document 3. Among these, the private type and consortium type are also called permission types because permission from the administrator is required to arrange operations in the distributed ledger network.

Of the above usage types, the consortium type is viewed as promising for cases in which multiple organizations (for example, a consortium in a specific industry or multiple companies involved in a supply chain) operate in cooperation, and is particularly viewed as promising for the enterprise field (it is viewed as promising for use in finance, industry, distribution, public services, IT infrastructure, social infrastructure, and the like). In the consortium type, for example, each node (hereinafter referred to as a "distributed ledger node") of multiple organizations participating in a distributed ledger network (consortium) synchronizes and works together based on a consensus building protocol, and executes transactions according to the predetermined contract details (smart contract).

However, in a case where a discrepancy occurs between an actual operating status (system configuration, or the like) of an information processing system configured using a distributed ledger network (hereinafter referred to as a "distributed ledger system") and an operational state that was planned (designed) for the participating organizations as a whole, the soundness, performance, and availability of the distributed ledger system may be impaired. In addition, in the consortium type, each participating organization prepares a node, so it is not always easy to ascertain whether or not the planned operating state of the participating organizations as a whole is being maintained.

In the above-mentioned Patent Document 1, an ordering service monitors performance indicators of peers and assigns endorsement requests to peers based on the performance indicators. However, Patent Document 1 does not describe a mechanism for solving the above-mentioned problems that arise in the operation of a consortium-type distributed ledger system. Furthermore, because performance indicators are monitored by a single organization, the results of the monitoring cannot be used as reliable evidence.

In addition, Non-Patent Document 3 describes that, as an operations service, the status of each node is monitored by acquiring health checks and metrics of each node. Moreover, Non-Patent Document 3 also describes a mechanism (Service Discovery) in which a gateway discovers available nodes. However, the mechanism described in Non-Patent Document 3 assumes that each organization monitors nodes that it owns or that it can use, and does not monitor all participating organizations. Furthermore, the system is monitored by a single organization (single point of trust), and thus the results of monitoring cannot be used as reliable evidence.

The present invention has been made in view of this background, and an object of the present invention is to provide a distributed ledger system and a method for controlling the distributed ledger system that can monitor the soundness of the distributed ledger system as a whole based on objective information.

Solution to Problem

One aspect of the present inventions for solving the above problems is a distributed ledger system that includes a distributed ledger node provided by each of a plurality of organizations, provides a distributed ledger network configured by the plurality of distributed ledger nodes, and is configured to execute a smart contract according to a transaction received from outside. The smart contract manages information in a distributed ledger while building consensus among the distributed ledger nodes of the plurality of organizations, receives a soundness monitoring result that is information acquired by a first organization monitoring soundness of the distributed ledger node of a second organization, verifies the soundness of the distributed ledger node of the second organization by verifying the received soundness monitoring result, and records a soundness verification result that is a result of verifying the soundness in the distributed ledger.

Other problems disclosed in the present application and methods for solving the problems will be made clear by the detailed description section and the drawings.

Effects of Invention

With the present invention, the soundness of a distributed ledger system as a whole can be monitored based on objective information.

BRIEF DESCRIPTION OF THE DRAWINGS

FIG. 2A is an example of a blockchain (BC).

FIG. 2F is an example of a blockchain (BC) (continued from FIG. 2E).

FIG. 3 is an example of state information.

FIG. 4A is an example of configuration information (organization information).

FIG. 4B is an example of configuration information (SC consensus condition information).

FIG. 6A is an example of state information (soundness monitoring method definition).

FIG. 6B is an example of state information (soundness monitoring results).

FIG. 6C is an example of state information (soundness verification results).

FIG. 6D is an example of state information (configuration design information).

FIG. 6E is an example of state information (configuration compliance status).

FIG. 6F is an example of state information (capacity information).

DESCRIPTION OF EMBODIMENTS

Figure 1:
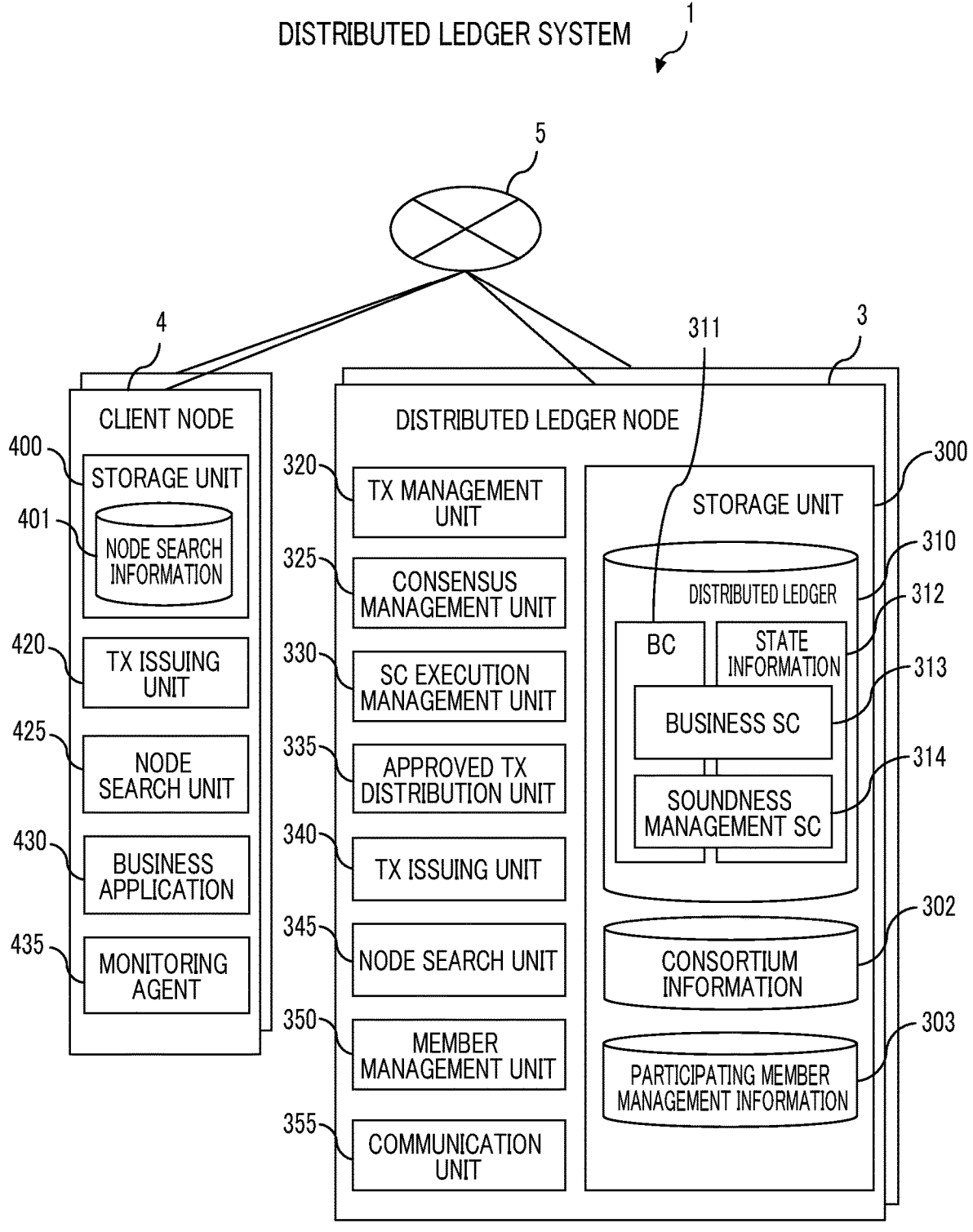
FIG. 1 is a diagram illustrating a schematic configuration of a distributed ledger system.

Embodiments of the present invention will be described below with reference to the drawings. Note that the following embodiments are merely examples illustrating the present invention, and are omitted and simplified as appropriate for clarity of explanation. The present invention can also be implemented in various other forms. Unless otherwise specified, each component may be either singular or plural.

In the following, examples of various types of information may be described using expressions such as "information" and "data"; however, various types of information may be expressed using data structures other than these (such as "table" and the like). In the following description, when describing identification information, expressions such as "identifier," "ID," and "identification information" may be used; however, these are interchangeable. In the following description, the letter "S" added in front of a reference numeral means a processing step.

In addition, in the following description, the distributed ledger is also referred to as a "blockchain" or "BC". Further, technology that uses a distributed ledger to enable direct transactions between users is hereinafter referred to as "distributed ledger technology." In addition, a Peer to Peer (P2P) network, which is constructed using multiple information processing devices (hereinafter referred to as "distributed ledger nodes" or a "consortium") that are communicably connected via a communication network, which is the basis for using distributed ledger technology, will hereinafter be referred to as a "distributed ledger network". Furthermore, a smart contract provided by distributed ledger technology is also referred to as "SC" below. In addition, a transaction issued for a smart contract (SC) is also referred to as a "TX".

Furthermore, in the present embodiment, "soundness" is determined by, for example, the following indicators:

(1) Alive status of each node (availability of the node from each organization, network reachability, whether ready to provide services, and the like)

(2) Deviation from the designed configuration (excess or deficiency in the number of nodes, excess or deficiency in specifications, and the like)

(3) Sufficiency status of performance and availability that should be met (does the performance value of synthetic monitoring meet a certain standard, and the like)

(4) Correctness of setting values (setting status of provided function enable/disable flags, software version, and the like)

First Embodiment

FIG. 1 illustrates a schematic configuration of a distributed ledger system 1, which is an information processing system illustrated as a first embodiment. The distributed ledger system 1 includes one or more distributed ledger nodes 3 and one or more client nodes 4. The distributed ledger nodes 3 and the client nodes 4 are configured using information processing devices (computers). These are connected to each other via a communication network 5 so as to be able to communicate with each other bidirectionally. The communication network 5 is a wireless or wired communication infrastructure configured using network equipment, and is, for example, the Internet, a Local Area Network (LAN), a Wide Area Network (WAN), various public communication networks, dedicated lines, and the like.

The distributed ledger system 1 includes a consortium-type distributed ledger network constituted by a plurality of distributed ledger nodes 3. Each organization that uses the distributed ledger network (hereinafter referred to as a "participating organization") has one or more distributed ledger nodes 3 and one or more client nodes 4. The distributed ledger network is a consortium-type distributed ledger network (consortium), and thus each organization operates its own distributed ledger nodes 3 in principle. It should also be noted that the distributed ledger nodes 3 and client nodes 4 owned by participating organizations only need to be in a state where they can be used directly by the participating organizations (in a state where they can be operated and managed), and they do not necessarily have to be owned by the participating organizations.

As illustrated in FIG. 1, the distributed ledger node 3 includes functions of a storage unit 300, a transaction management unit (hereinafter referred to as "TX management unit 320"), a consensus management unit 325, and a smart contract execution management unit (hereinafter referred to as "SC execution management unit 330"), an approved TX distribution unit 335, a transaction issuing unit (hereinafter referred to as "TX issuing unit 340"), a node search unit 345, a member management unit 350, and a communication unit 355.

Of the above functions, the storage unit 300 stores information (data) for the distributed ledger 310, consortium information 302, and participating member management information 303.

The distributed ledger 310 includes a blockchain (BC) (hereinafter referred to as "BC 311"), state information 312, a business SC 313 which is a smart contract (SC) that achieves processing related to the organization's business, and a soundness management SC 314, which is a smart contract (SC) that performs processing related to soundness management of distributed ledger system 1.

In the BC 311, for example, transaction (TX) history (reception history, execution history) is managed. In addition, in the state information 312, for example, information based on the history of transactions (TX) and information necessary for executing a smart contract (SC) (hereinafter referred to as "state information") are managed. The state information 312 is managed, for example, in a table of a database managed by a DBMS (Data Base Management System) such as NOSQL. The state information 312 includes, for example, information based on the execution result of a transaction (TX) managed in a Key-Value format.

The consortium information 302 includes information on the organizations that make up the distributed ledger network, various consensus conditions (conditions for deciding whether to accept a transaction (TX), (SC consensus conditions described later) or the like) negotiated between the organizations (between the distributed ledger nodes 3). The SC consensus condition is also recorded as a blockchain (BC) (BC 311) of the distributed ledger 310. The consortium information 302 is shared between distributed ledger nodes 3 of each organization.

Participating member management information 303 includes information (identification information, authentication information, various attribute information, and the like) regarding members of the participating organization (including various nodes, administrators, users, and the like).

The TX management unit 320 receives transactions (TX) transmitted from the client node 4 and other distributed ledger nodes 3. The TX management unit 320 also performs processing related to acquisition of transaction (TX) history (reception history, execution history) and execution results, presentation of transaction (TX) execution results (presentation via user interface, or the like), and the like. Moreover, when a transaction (TX) is received, the TX management unit 320 cooperates with the member management unit 350 to perform processing related to authentication of the issuer (client node, member, and the like) of the transaction (TX).

The consensus management unit 325 performs processing related to consensus building with other distributed ledger nodes 3 as to whether a transaction (TX) received from a client node 4 or a distributed ledger node 3 may be accepted. When a consensus is reached, the consensus management unit 325 cooperates with the SC execution management unit 330 to deploy a smart contract (SC), execute the deployed smart contract (SC), and record the history of the transaction (TX) and the execution result of the transaction (TX) in the distributed ledger 310.

The SC execution management unit 330 performs processing related to the deployment of a smart contract (SC) and the execution of a deployed smart contract (SC) in a case where a consensus is established with another distributed ledger node 3. Note that consensus building and execution of a smart contract (SC) do not necessarily need to be carried out by all distributed ledger nodes 3 that make up the distributed ledger network; and consensus building and execution of a smart contract (SC) may be performed between some distributed ledger nodes 3, and the result may be distributed to other distributed ledger nodes 3 via the communication network 5 in cooperation with the approved TX distribution unit 335 (the arrangement in that case depends on the consensus-building algorithm).

The approved TX distribution unit 335 distributes the results of the above consensus building and execution of the smart contract (SC) (history, execution results, and the like of the transactions (TX)) via the communication network 5 to the distributed ledger nodes 3 that do not participate in the above consensus building or execution of the smart contract (SC).

The TX issuing unit 340 issues a transaction (TX) to the distributed ledger nodes 3 (including itself). Note that as described above, in the present embodiment, not only a client node 4 but also a distributed ledger node 3 may issue a transaction (TX) to a distributed ledger node 3.

The node search unit 345 searches the communication network 5 in response to requests transmitted from other information processing devices such as a client node 4, and determines the status of each distributed ledger node 3 making up the distributed ledger system 1, or searches for currently available distributed ledger nodes 3 in the distributed ledger system 1 based on the participation status of each distributed ledger node 3 in the distributed ledger network. Note that the above search is performed, for example, using a mechanism of a service discovery (Gateway function in Non-Patent Document 3, or the like). In addition, the node search unit 345, based on the search results, selects a distributed ledger node 3 that transmits a transaction (TX) or a distributed ledger node 3 that is used for consensus building.

The member management unit 350 performs processing related to registration of participating organizations and members participating in the distributed ledger network. In addition, the member management unit 350 also performs authentication processing for participating organizations and members. The member management unit 350, for example, authenticates participating organizations and members using a pair of a private key and a public key (hereinafter referred to as "key pair") in public key cryptography, signs transactions (TX), and controls the execution authority of the smart contract (SC). Information on participating organizations and members is managed by participating member management information 303.

The communication unit 355 performs processing related to communication with the client node 4 and other distributed ledger nodes 3 via the communication network 5. For example, the communication unit 355 performs communication regarding consensus building among other distributed ledger nodes 3, distribution of approved transactions (TX) to other distributed ledger nodes 3, and the like.

As illustrated in FIG. 1, the client node 4 has the following functions: A storage unit 400, a TX issuing unit 420, a node search unit 425, a business application 430, and a monitoring agent 435.

The storage unit 400 stores node search information 401. The node search information 401 includes information indicating currently available distributed ledger nodes 3 in the distributed ledger system 1, which have been searched for by the node search unit 425.

The TX issuing unit 420 transmits (issues) a transaction (TX) to the distributed ledger node 3. The TX issuing unit 420, for example, generates the above transaction in response to an operation input by a member of the organization, and transmits the transaction to the distributed ledger node 3. Information (identification information, authentication information, and the like) of an issuing source (organization, member, client node 4) of a transaction (TX) is attached to the transaction (TX).

Similar to the node search unit 345 of the distributed ledger node 3, the node search unit 425 searches the communication network 5, and based on the status of each distributed ledger node 3 and the participation status of each distributed ledger node 3 in the distributed ledger network, searches for currently available distributed ledger nodes 3 in the distributed ledger system 1. In addition, the node search unit 425, based on the search results, selects a distributed ledger node 3 that transmits a transaction (TX) or a distributed ledger node 3 that is used for consensus building.

The business application 430 is a function implemented by application software (programs and data) that performs or supports business performed by an organization. For example, when providing a function related to a business, the business application 430 transmits (issues) a transaction (TX) related to the business SC 313 to the distributed ledger node 3 in cooperation with the TX issuing unit 420.

The monitoring agent 435 performs processing related to monitoring the soundness of distributed ledger nodes 3 of other organizations. The monitoring agent 435 monitors the soundness of the distributed ledger node 3 of another organization according to a monitoring method described below (for example, the contents of the soundness monitoring method definition 551, such as external shape monitoring and a monitoring method based on information acquired by the node search unit 345) stored in the state information 312 of the distributed ledger node 3. The monitoring agent 435 cooperates with the TX issuing unit 420 to generate a transaction (TX) for reporting (notifying of) information (information indicating the soundness of another organization's distributed ledger node 3 (hereinafter also referred to as "soundness monitoring results")) acquired through monitoring to the soundness management SC 314 of the distributed ledger node 3, and to transmit (issue) the generated transaction (TX) to the distributed ledger node 3.

FIG. 2A to FIG. 2F are examples of a data structure of each block of the blockchain (BC) (BC 311) of the distributed ledger 310 illustrated in FIG. 1. In distributed ledger technology, multiple transactions (TX) are each managed as a block, and the blockchain (BC) (BC 311) has a structure in which each block is chained together so that each block has the hash value of the previous block. With the above structure, in a case where the value of the previous block changes even by one bit, the hash values of all subsequent blocks also change, making it difficult for malicious parties to tamper with the contents.

Note that, in this embodiment, although a case in which one transaction (TX) and one block correspond one-to-one is illustrated, a plurality of transactions (TX) may correspond to one block. In addition, in the present example, smart contracts (TX) are configured to be connected as a single blockchain (BC), but other configurations may be used as long as each participating organization can manage and refer to them. Moreover, in the present example, a plurality of smart contracts (TX) are individually defined; however, the plurality of smart contracts (TX) may be aggregated into a single smart contract (TX).

Each block 311a to 311f illustrated in FIGS. 2A to 2F includes various information such as TX information 21, a previous block hash value 23, and a state hash value 24 (a hash value generated from state information, which will be described later).

The block 311a illustrated in FIG. 2A includes information on a transaction (TX) (hereinafter referred to as a "deployment TX") for deploying the business SC 313. Note that the business SC 313 is, for example, a smart contract (SC) of a business related to a business contract in commercial transactions (transactions of virtual currency between organizations such as companies).

As illustrated in FIG. 2A, the TX information 21 of the block 311*a* includes a timestamp 211, SC_ID 212, TX type 213, SC entity 214, SC input specification 215, SC meta definition 216, TX issuer 217, TX execution/approver 218, approved TX distributor 219, and RW set 220.

Among these, the timestamp 211 stores the date and time (timestamp) when the transaction (TX) was issued.

The SC_ID 212 stores a smart contract (SC) identifier (hereinafter referred to as "SC_ID").

The TX type 213 stores information ("deployment" in this example) indicating the type of the transaction (TX) ("deployment", "execution", "reference", and the like).

A smart contract (SC) entity (for example, executable binary data (execution code), and the like) is stored in the SC entity 214.

The SC input specification 215 stores information that allows the user to understand function names and arguments thereof included in the smart contract (SC). Note that in the illustrated block 311*a*, a business SC 313 including at least the following functions (hereinafter referred to as "SC functions") is defined.

Function name: Transaction ( ) Input arguments: Sending customer ID, Receiving customer ID, Remittance amount, Return value: Success or failure Function name: Reference all transactions ( ) Input argument: Customer ID, Return value: List of all transactions for the specified customer The SC meta definition 216 stores parameters determined according to input arguments specified when the smart contract (SC) is deployed. The above parameters include, for example, the consensus conditions at the time of execution of the smart contract (SC) (the relevant business SC) (for example, "accepting TX with approval of more than half of participating organizations, or the like"), other various definition information, and the like.

The TX issuer 217 stores information on the issuer of the transaction (TX) (for example, the identifier (hereinafter referred to as "member ID") of the issuer (client node 4, distributed ledger node 3, administrator, user, and the like), and information regarding electronic signatures (information used to verify an issuer and whether data has been tampered with), and the like. Note that the above electronic signatures are performed using each member's private key issued by the member management unit 350, and verified using the public key (certificate) of the private key.

Similar to the TX issuer 217, the TX execution/approver 218 stores information on participants (hereinafter referred to as "TX execution/approvers") involved in consensus building and smart contract (SC) execution performed by the consensus management unit 325 and SC execution management unit 330.

The approved TX distributor 219 stores information on participants (hereinafter referred to as "approved TX distributor") involved in the distribution process by the approved TX distribution unit 335.

The RW set 220 stores information (hereinafter referred to as "RW set" (RW: Read-Write)) that is referenced or updated during the processing performed on the transaction (TX). Note that the RW set corresponds to the state information described later. The RW set and state information will be described later.

Figure 2B:
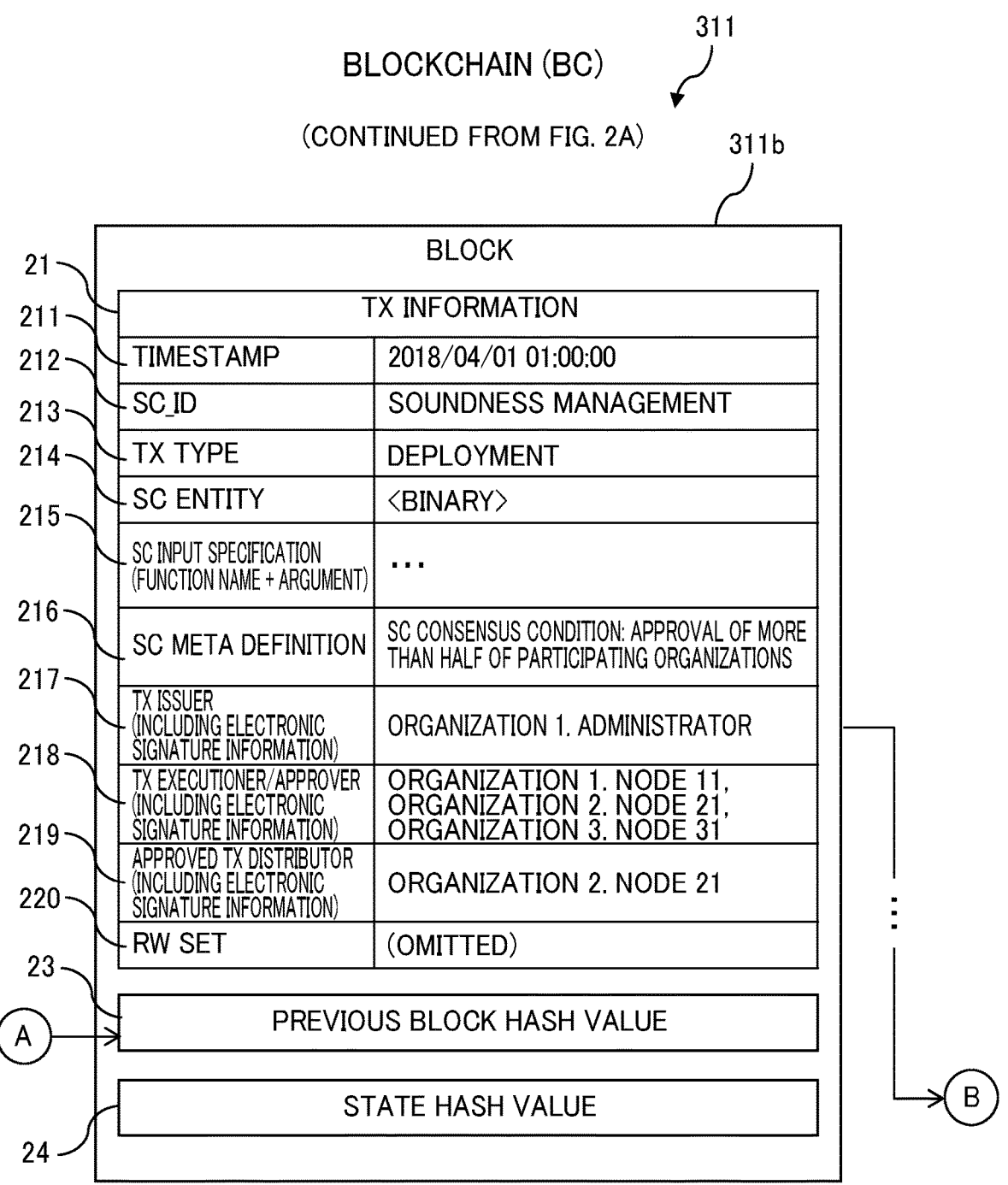
FIG. 2B is an example of a blockchain (BC) (continued from FIG. 2A).
Figure 2C:
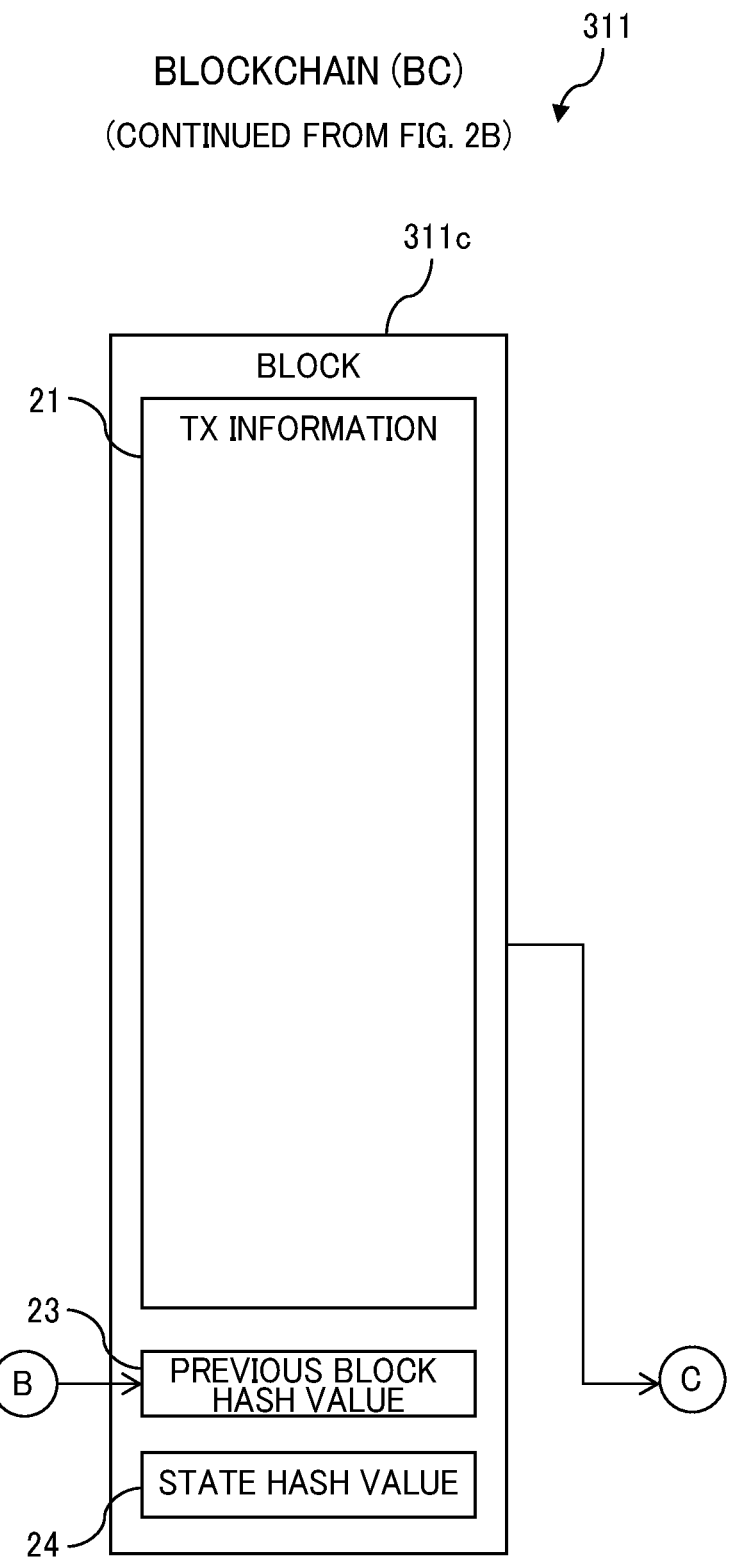
FIG. 2C is an example of a blockchain (BC) (continued from FIG. 2B).
Figure 2D:
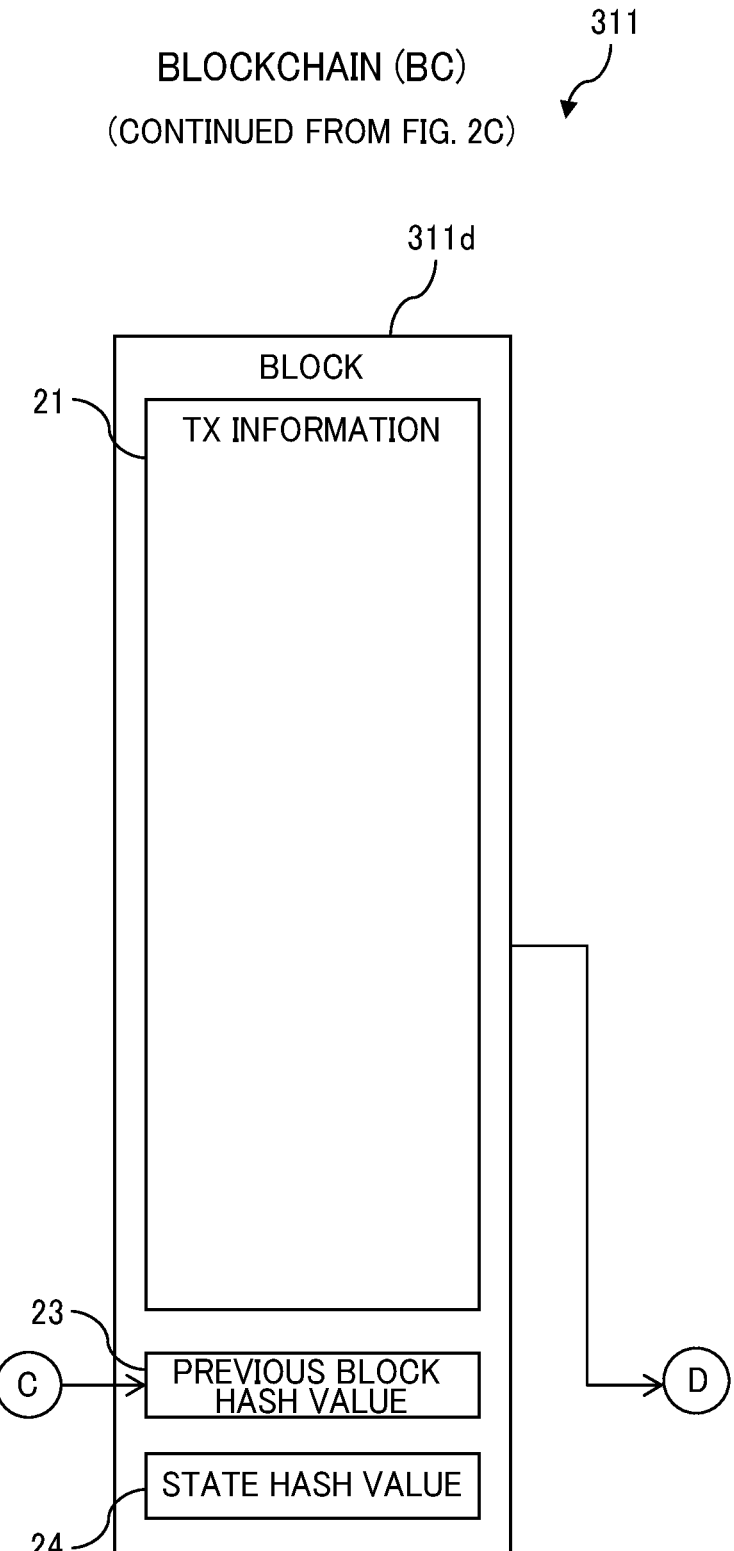
FIG. 2D is an example of a blockchain (BC) (continued from FIG. 2C).
Figure 2E:
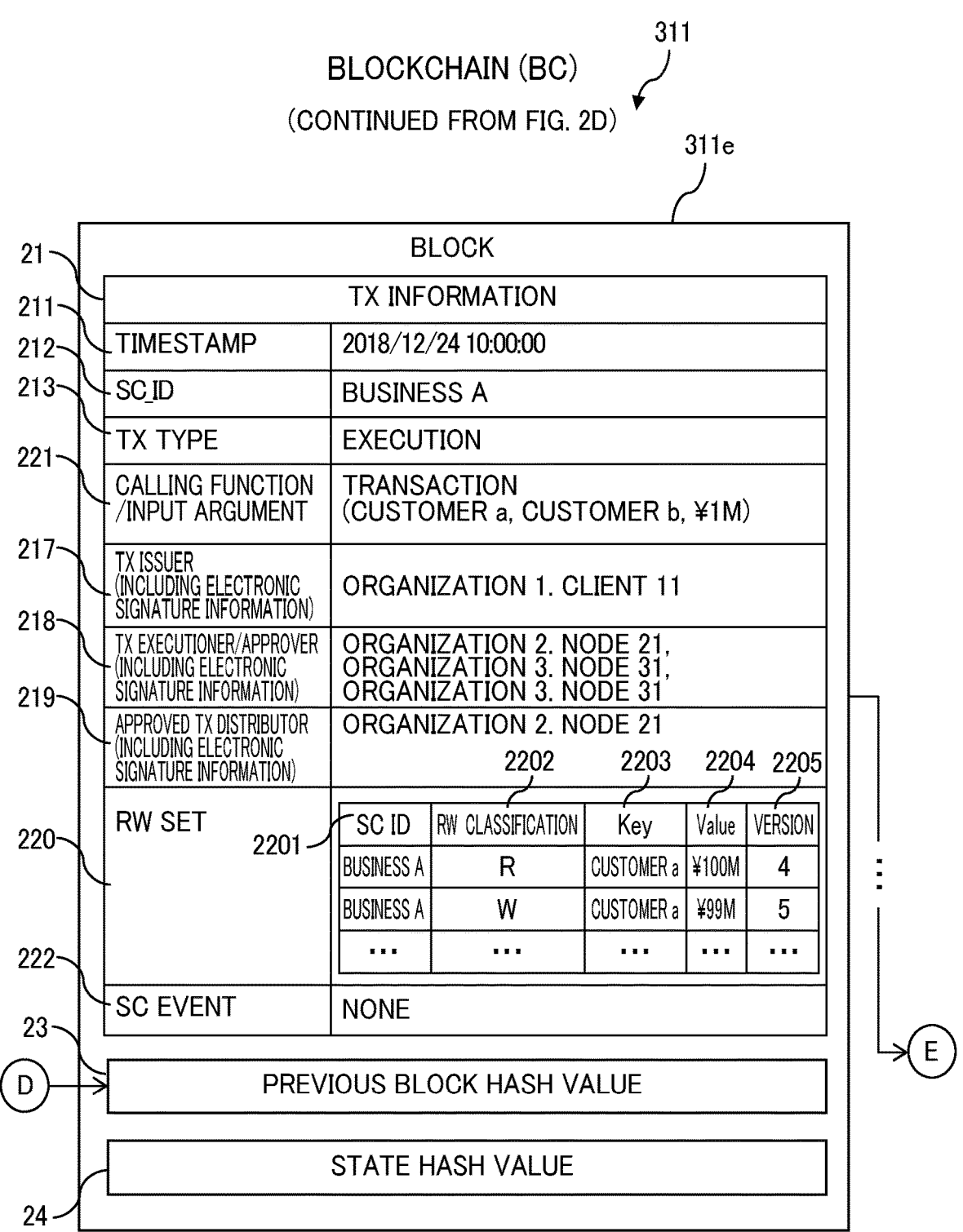
FIG. 2E is an example of a blockchain (BC) (continued from FIG. 2D).
Figure 2G:
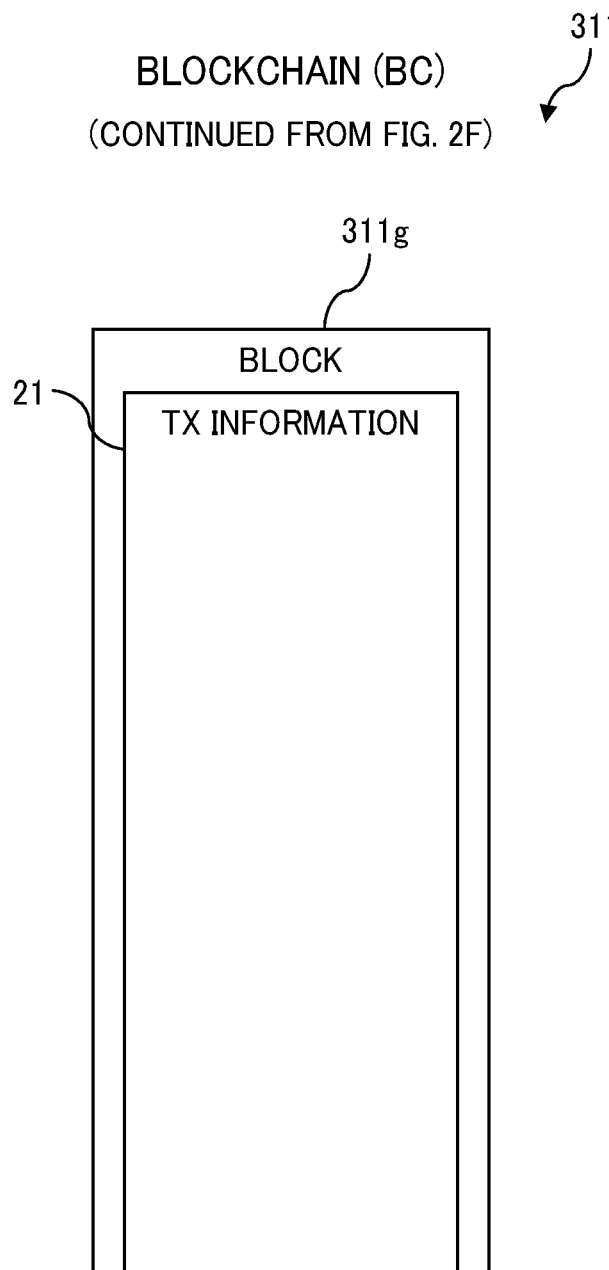
FIG. 2G is an example of a blockchain (BC) (continued from FIG. 2F).

Block 311*e* illustrated in FIG. 2E is a transaction (hereinafter referred to as an "execution TX") for (executing) functioning (calling) the business SC deployed by the deployment TX of block 311*a* illustrated in FIG. 2A.

As illustrated in FIG. 2E, the TX information of the illustrated block 311*e* includes a timestamp 211, a SC_ID 212, a TX type 213, a calling function/input argument 221, a TX issuer 217, a TX execution/approver 218, and an approved TX distributor 219, a RW set 220, and a SC event 222. Note that of the above items, the timestamp 211, SC_ID 212, TX issuer 217, TX execution/approver 218, and approved TX distributor 219 are the same as those in block 311*a* of FIG. 2A, so an explanation of them will be omitted.

In a case where the process executed by the execution TX includes updating the distributed ledger 310, "execution" is stored in the TX type 213, and in a case where the process executed by the execution TX is a reference process that does not include the update process of the distributed ledger 310, "reference" is stored in the TX type 213. In the present example, "execution" is stored in the TX type 213.

A SC function called by a smart contract (SC) and an input argument given to the SC function are stored in the calling function/input argument 221. In this example, "transaction ( )" as the SC function and input arguments "Customer a, Customer b, ¥1M" are stored in the calling function/input argument 221.

Information (RW set, state information) that is referenced or updated during the process performed on the transaction (TX) as described above is stored in the RW set 220. In this example, information that is referenced/updated when a smart contract (SC) is deployed or executed is stored in the RW set 220.

In the illustrated block 311*e*, a table having one or more records having the following items: SC_ID 2201, RW classification 2202, Key 2203, Value 2204, and Version 2205 is stored in the RW set 220.

Among the above items, a smart contract (SC) identifier (SC_ID) is stored in the SC_ID 2201.

The SC_ID and information indicating whether it is a reference (Read) or an update (Write) (hereinafter referred to as "RW classification") is stored in the RW classification 2202.

Information referenced or updated by the smart contract (SC) specified by the SC_ID is stored in the Key 2203 and the Value 2204.

Information indicating the version of the above information corresponding to the pair of the SC_ID and the Key is stored in the Version 2205. The version is incremented by one each time the information above is updated, for example.

In the example in FIG. 2E, the SC function "Register (Customer a, Customer b, ¥10M)" of the smart contract (SC) is executed, the Key "Customer a" is referenced to acquire the Value "¥100M" of the version number "4" (first line), and information indicating that the version number has been updated to "5" as a result of updating with the Value "¥90M" is managed as an RW set.

In this way, the execution result of the transaction (TX) is managed as a RW set (state information). Therefore, by referencing the RW set, it is possible to directly acquire the execution result of the transaction (TX) without executing the smart contract (SC). Therefore, for example, the execution results of the transaction (TX) can be efficiently shared among a plurality of distributed ledger nodes 3 including a distributed ledger node 3 that does not execute a smart contract (SC).

The SC event 222 illustrated in FIG. 2E stores information (hereinafter referred to as "event information") regarding an event generated by the distributed ledger node 3. The TX management unit 320 of the distributed ledger node 3 generates event information at a timing such as when adding a transaction (TX) history to the BC 311 of the distributed ledger 310, and stores the generated event information in the SC event 222.

Client nodes 4 and distributed ledger nodes 3 participating in the distributed ledger system 1 can reference the event information stored in the SC event 222 of the BC 311 via the communication network 5 (that is, event information may be shared between each distributed ledger node 3 and between each distributed ledger node 3 and each client node 4 via the SC event 222). In addition, the distributed ledger node 3 and the client node 4 may execute various processes according to the event information.

The deployment TX block of the business SC 313 (block 311a illustrated in FIG. 2A) and the execution TX block of the business SC 313 (block 311e illustrated in FIG. 2E) have been described above; however, the deployment TX block (block 311b illustrated in FIG. 2B) of the soundness management SC 314 and the execution TX block (block 311f illustrated in FIG. 2F) of the soundness management SC 314 have a similar configuration. Note that in this way, the business SC 313 and the soundness management SC 314 have a common block, and the functions of the distributed ledger node 3 for processing both can be shared. Therefore, it is possible to efficiently implement the mechanism of the present embodiment.

FIG. 3 is an example of the data structure of the state information 312 of the distributed ledger 310 illustrated in FIG. 1. In an information management mechanism using a blockchain (BC), it is necessary to follow the blockchain (BC) in order to acquire the latest state of the information managed by the blockchain (BC) (for example, the latest balance of virtual currency when virtual currency is managed in the blockchain (BC)), which is inefficient. Therefore, in the present embodiment, a mechanism for managing the latest state of information managed by a blockchain (BC) as state information 312, which is obtained by reflecting all the contents of the RW set described above (for example, the mechanism described in non-patent Document 3) will be adopted. Note that, in the present embodiment, it is assumed that the SC execution management unit 330 acquires the entity of the smart contract (SC) using SC_ID as a key and executes the smart contract (SC), and it is assumed that the state information 312 is managed (a data storage area is prepared) for each smart contract (SC).

As illustrated in FIG. 3, the illustrated state information 312 includes one or more records having each item of a SC_ID 3121, a SC entity 3122, and an internal table 3123.

The SC_ID of the smart contract (SC) is stored in the SC_ID 3121.

A smart contract (SC) entity (for example, executable binary data (execution code), and the like) is stored in the SC entity 3122. Thus, the SC execution management unit 330 is able to acquire and execute the entity of the smart contract (SC) using the SC_ID as a key.

Information used when executing the smart contract (SC), such as execution results of the SC, is managed in the internal table 3123. The contents of the internal table 3123 are updated every time a transaction (TX) is executed. In this example, the internal table 3123 manages the latest values of the RW sets stored in the RW sets 220 illustrated in FIG. 2E and FIG. 2F.

In the example illustrated in FIG. 3, information is stored in the internal table 3123 in Key-value format; however, Value may be stored in the internal table 3123 in other formats such as JSON (JavaScript Object Notation) (both "Java" and "JavaScript" are registered trademarks) format. Accordingly, for example, information may be stored in the internal table 3123 as a table of an arbitrary data schema. In addition, by devising a key design, it is possible to virtually manage a plurality of pieces of information in the internal table 3123 with different schemas.

FIG. 4A is an example of consortium information 302 (hereinafter referred to as "organization information 302a") illustrated in FIG. 1. Organization information 302a includes information regarding participating organizations.

As illustrated in FIG. 4A, the illustrated organization information 302a is composed of a plurality of records having items such as a business ID 3021, an organization ID 3022, and a member ID 3023.

Among the above items, the business ID 3021 stores a business ID ("business A", "business B", and the like) that is an identifier of a business performed using the distributed ledger network.

The organization ID 3022 stores organization IDs ("Organization 1", "Organization 2", "Organization 3", "Organization 4", and the like) that are identifiers of participating organizations.

The member ID 3023 stores the member IDs of the members of the participating organizations (such as "Distributed ledger node 11," "Client node 11," "Administrator 11," and "User 11").

FIG. 4B is another example of the consortium information 302 illustrated in FIG. 1 (hereinafter referred to as "SC consensus condition information 302b"). The SC consensus condition information 302b includes information related to conditions (hereinafter referred to as "SC consensus conditions") for reaching a consensus on the smart contract (SC) (accepting the execution results of the smart contract (SC)) set for each business (each business ID).

As illustrated in FIG. 4B, the illustrated SC consensus condition information 302b is composed of one or more records having items such as a business ID 3025 and an SC consensus condition D 3026.

Of the above items, the business ID 3025 stores the aforementioned business ID.

The SC consensus condition D 3026 stores the SC consensus condition set for the business concerned. Note that the SC consensus conditions are determined based on the contents of the BC 311 (SC consensus conditions stored in the SC meta definition 216 in FIG. 2A).

The example in FIG. 4B illustrates that a SC consensus condition "a majority vote of participating organizations is required in order to reach a consensus (establish a consensus)" is set in the record with the business ID "Business A" for the business.

In addition, the example in FIG. 4B illustrates that an SC consensus condition "If the number of distributed ledger nodes 3 in which a failure has occurred is f, the consent of 2f+1 or more participating organizations is required for a consensus to be reached (for a consensus to be established). (For example, if f is 1, the consent of 3 or more organizations is required for a consensus to be established.)" is set in the record with the business ID "Business B" for the business.

Figure 5:
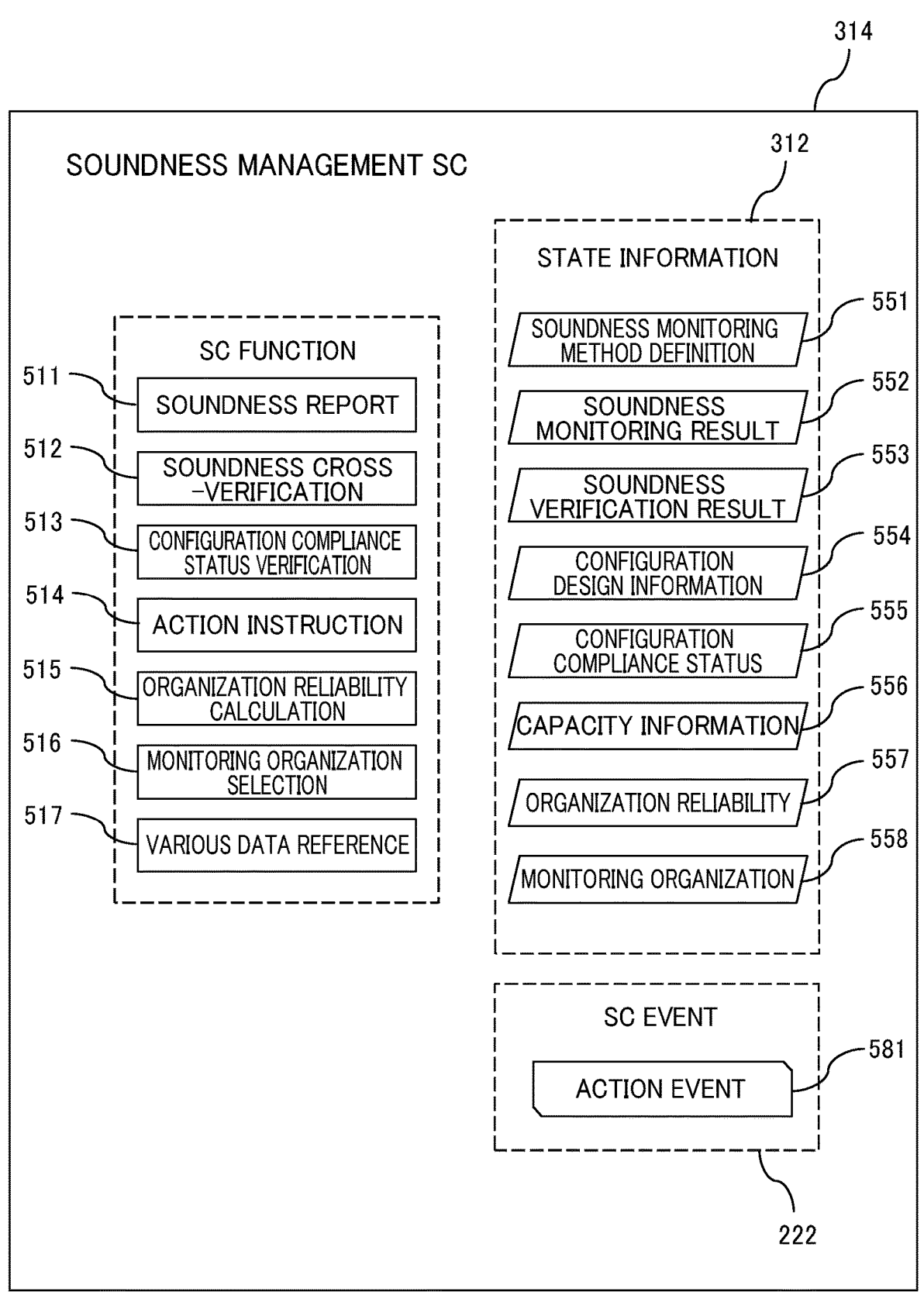
FIG. 5 is a block diagram illustrating a soundness management SC, state information, and SC events.

FIG. 5 is a diagram illustrating the soundness management SC 314 illustrated in FIG. 1, the state information 312 defined and operated by the soundness management SC 314, and the SC event 222.

As illustrated in FIG. 5, the soundness management SC 314 includes SC functions (soundness report 511, soundness cross-verification 512, configuration compliance status verification 513, action instruction 514, organization reliability calculation 515, monitoring organization selection 516, and various data reference 517). The SC function appropriately accesses (updates or references) the state information 312 and the SC event 222 of the BC 311 during execution.

As illustrated in FIG. 5, the illustrated state information 312 includes a soundness monitoring method definition 551, soundness monitoring results 552, soundness verification results 553, configuration design information 554, configuration compliance status 555, capacity information 556, and organization reliability 557, and monitoring organization 558. In addition, the illustrated SC event 222 includes an action event 581.

Of the state information 312, the soundness monitoring method definition 551 includes information (hereinafter referred to as "soundness monitoring method") in which the common monitoring method and monitoring means that each organization should use when monitoring the soundness of the configuration (distributed ledger node 3, client node 4) of other organizations is specified (defined).

The soundness monitoring result 552 includes information related to the result of each organization's client node 4 monitoring the soundness of the other organization's configuration (distributed ledger node 3, client node 4) (hereinafter referred to as "soundness monitoring result").

The soundness verification results 553 include information indicating the results of determining the soundness of each distributed ledger node 3 (life or death of the distributed ledger node 3, and the like) by verifying the soundness monitoring results mutually reported by each organization (hereinafter referred to as "soundness verification results").

The configuration design information 554 includes information (hereinafter referred to as "configuration design information") about the configuration that each organization should prepare and provide based on the perspective of the entire consortium. The configuration design information 554 may be set in a top-down manner from the perspective of the entire consortium, or may be set in a bottom-up manner based on the requests and proposals of individual organizations. Note that, as will be described later, the contents of the configuration design information 554 may be automatically modified based on an action event 581.

The configuration compliance status 555 includes information indicating the degree of compliance of each organization's configuration with the configuration design information (hereinafter referred to as "configuration compliance status"), which is derived by comparing and contrasting the soundness verification results 553 and the configuration design information 554.

Capacity information 556 includes information (hereinafter referred to as "capacity information") indicating the range and upper limit of resources that each organization can provide.

Organization reliability 557 includes information (hereinafter referred to as "organization reliability") that indicates reliability of each organization when each organization monitors the configuration of other organizations (distributed ledger node 3, client node 4).

The monitoring organization 558 includes information indicating an organization responsible for soundness monitoring (hereinafter referred to as "monitoring organization").

Note that details of the capacity information 556 and the monitoring organization 558 will be explained in a second embodiment described later.

The action event 581 of the SC event 222 includes information of an event (hereinafter also referred to as an "action event") generated by the soundness management SC 314 when the configuration compliance status does not reach a preset standard (configuration design information). The monitoring agent 435 of the client node 4 references the action event 581 which is the SC event 222 of the BC 311 via the communication network 5 at any time, and after confirming that the action event 581 includes instructions for itself, performs a process according to the content of the action event 581 (a process of outputting information urging the organization to maintain or expand the distributed ledger node 3 so that the configuration compliance information satisfies the standard (configuration design information) or the like).

The soundness report 511, which is an SC function of the soundness management SC 314, receives a transaction (TX) for reporting soundness monitoring results transmitted from a client node 4, and executes the received transaction (TX), and records the soundness monitoring result in the state information 312 as a soundness monitoring result 552.

The soundness cross-verification 512, which is a SC function above, verifies the soundness monitoring results notified from each organization, and records the verified results in the state information 312 as the soundness verification results 553.

The configuration compliance status verification 513, which is a SC function above, verifies the configuration compliance status of each organization by comparing and contrasting the soundness verification results and the configuration design information, and records the verified results in the state information 312 as the configuration compliance status 555.

The action instruction 514, which is a SC function above, identifies an organization with insufficient soundness by referring to the configuration compliance status 555, generates an action event targeting the identified organization (the client node 4 thereof), and stores the generated action event in the SC event 222 as an action event 581.

The organization reliability calculation 515, which is a SC function above, calculates the organization reliability of each organization involved in soundness monitoring, and records the obtained organization reliability in the state information 312 as the organization reliability 557. Note that details of the organization reliability calculation 515 will be explained in the second embodiment.

The monitoring organization selection 516, which is a SC function above, selects the organization responsible for soundness monitoring. Note that details of the monitoring organization selection 516 will be explained in the second embodiment.

The various data reference 517, which is a SC function above, is a function (for example, a query function) that accesses information sources such as the distributed ledger 310, the consortium information 302, and the participating member management information 303 to acquire or refer to various data.

Note that the SC functions illustrated above may be implemented as independent functions, or may be implemented as a single SC function that integrates all or part of them.

Next, various information (data) illustrated in FIG. 5 will be explained.

FIG. 6A is an example of the soundness monitoring method definition 551 illustrated in FIG. 5. As illustrated in FIG. 6A, the illustrated soundness monitoring method definition 551 is composed of one or more records having items such as a monitoring method ID 5511, a monitoring method 5512, a monitoring frequency 5513, a determination criterion 5514, and a determination method 5515.

Of the above items, the monitoring method ID 5511 stores a monitoring method ID that is an identifier of the monitoring method.

The monitoring method 5512 stores information indicating the monitoring method used for soundness monitoring.

The monitoring frequency 5513 stores information indicating the frequency with which soundness monitoring is performed.

The determination criterion 5514 stores information (SC consensus conditions) indicating the criteria for determining the soundness of the distributed ledger node 3.

The determination method 5515 stores information indicating a determination method for determining the soundness of the distributed ledger node 3 based on soundness monitoring results by a plurality of organizations.

For example, a record with the monitoring method ID "monitoring method 01" in the soundness monitoring method definition 551 illustrated in FIG. 6A defines that a monitoring method using the "service discovery API" (method in which the client node 4 of each organization monitors soundness based on the result of acquiring the node search information 401 by the node search unit 345) is performed at a monitoring frequency of "60 seconds". In addition, the same record defines that the soundness monitoring results can be accepted (determined) in a case where the "SC consensus conditions" are met, and that the life or death of each node can be determined by a "majority vote" of the soundness monitoring results gathered from multiple organizations.

In addition, a record with the monitoring method ID "monitoring method 02" in the soundness monitoring method definition 551 illustrated in FIG. 6A defines that monitoring of the "TX execution time by external monitoring" of each distributed ledger node 3 from the client node 4 of each organization is performed at a monitoring frequency of "60 seconds". In addition, the same record defines that it is possible to accept (determine) the soundness monitoring results in a case where the "SC consensus conditions" are met and that the distributed ledger node 3 is determined to be "normal" if the average value of the execution time according to the collected reports is "less than 3 seconds".

Note that in the example of the soundness monitoring method definition 551, the contents of each item are described in text format; however, the contents of each item are, may be, for example, written in the form of JSON (JavaScript Object Notation) ("Java", "JavaScript"). In addition, in order to efficiently express more complex processing, the contents of each item may be described in accordance with a programming language or DSL (Domain Specific Language), for example.

FIG. 6B is an example of the soundness monitoring result 552 illustrated in FIG. 5. As illustrated in FIG. 6B, the illustrated soundness monitoring result 552 is composed of one or more records having items such as a monitoring organization ID 5521, a monitoring target 5522, a monitoring result 5523, a monitoring date and time 5524, and a time span 5525.

Of the above items, the monitoring organization ID 5521 stores the organization ID of the organization that has monitored the distributed ledger nodes 3 of other organizations and reported the results (hereinafter also referred to as "monitoring organization ID"). Note that the monitoring organization ID 5521 may store an identifier of the client node 4 owned by the organization (hereinafter referred to as "client node ID").

The monitoring target 5522 includes an organization ID 55221 and a distributed ledger node ID 55222 as small items. The organization ID 55221 stores the organization ID of the organization that is the monitoring target of the monitoring (hereinafter also referred to as "monitoring target organization ID"). In addition, the distributed ledger node ID 55222 stores the identifier of the distributed ledger node 3 that is the target of monitoring in the monitoring (hereinafter referred to as "distributed ledger node ID").

The monitoring result 5523 stores information indicating the result of the monitoring. In this example, as a result of monitoring, in a case where the soundness of the distributed ledger node 3 to be monitored is determined to be normal, "OK" is stored, and if the soundness is determined to be abnormal, "NG" is stored.

The monitoring date and time 5524 stores information (timestamp) indicating the date and time when the monitoring result of the record was reported. Monitoring of the soundness of the distributed ledger node 3 of another organization by the monitoring agent 435 of the client node 4 is performed repeatedly (regularly, or the like) according to the monitoring frequency 5513 of the soundness monitoring method definition 551, and the results are reported in the distributed ledger node 3. Note that there may be some variation in the above dates and times between organizations.

The time span 5525 stores a time span that is information used for the purpose of absorbing the above-mentioned variations between organizations. The time span is set, for example, by the soundness management SC or the monitoring agent 435 of each organization. Verification by the soundness cross-verification 512 is performed in units of soundness monitoring results for each time span. For example, the record indicated by reference numeral 552a in FIG. 6B indicates that at the date and time "(omitted):00:001" within the time span specified by "Span 1-1", the result of "Organization 1" monitoring the soundness of "Node 1" of "Organization 2" was OK.

FIG. 6C is an example of the soundness verification results 553 illustrated in FIG. 5. As illustrated in FIG. 6C, the illustrated soundness verification result 553 is configured by one or more records having items such as a monitoring target 5531 and a soundness verification result history 5532.

Of the above items, the monitoring target 5531 (organization ID 55311, distributed ledger node ID 55312) is the same as the monitoring target 5522 in FIG. 6B, so a description thereof will be omitted.

The soundness verification result history 5532 stores the results (soundness verification results) of verifying the soundness (OK/NG) of the distributed ledger node 3 by verifying the soundness monitoring results reported by each organization. In the example illustrated in FIG. 6C, the soundness determination results for each time span are stored in chronological order. For example, in the first row of records 553a, the soundness verification result for "Node 2" of "Organization 1" is "OK" for "Span 1-1" and "Span 1-2", and "NG" for "Span 1-3", and the results are stored (in JSON format).

FIG. 6D is an example of the configuration design information 554. The configuration design information 554 includes information indicating the configuration that each organization should prepare and provide for the consortium as a whole. As illustrated in FIG. 6D, the illustrated configuration design information 554 includes one or more records having items such as an organization ID 5541, a prepared nodes 5542, and specification details 5543.

Of the above items, the organization ID 5541 stores the aforementioned organization ID.

The prepared nodes 5542 stores information indicating the number of distributed ledger nodes 3 that the organization should prepare and provide for the consortium.

The specification details 5543 stores information indicating the specifications that should be prepared and provided by the organization and that should be satisfied by the distributed ledger node 3. The above information includes, for example, information indicating the hardware specifications (processing performance, capacity, and the like of processor, memory, storage, and the like) of the distributed ledger node 3, and software specifications (types, versions, and the like of software such as operating system and application software), and information indicating the functions of the distributed ledger node 3 (TX approval function, approved TX distribution, and the like). The content of the above information is determined, for example, according to the management policy of the consortium. Note that when the client node 4 monitors the soundness of the distributed ledger nodes 3 of another organization, the state of compliance with the above information may be monitored.

FIG. 6E is an example of the configuration compliance status 555. The configuration compliance status 555 includes information indicating the configuration compliance status of the distributed ledger node 3 of each organization, which is generated by comparing and contrasting the soundness verification results 553 of FIG. 6C and the configuration design information 554 of FIG. 6D. As illustrated in FIG. 6E, the illustrated configuration compliance status 555 includes one or more records having items such as an organization ID 5551, a compliance status 5552, a configuration compliance rate 5553, and a time span 5554.

Of the above items, the organization ID 5551 stores the aforementioned organization ID.

The compliance status 5552 stores information indicating the configuration compliance status of the organization.

The configuration compliance rate 5553 stores information indicating the configuration compliance rate of the organization.

The time span 5554 stores information indicating the time span in which the configuration compliance status of the record was confirmed. Note that in a case where the granularity is too fine to verify the configuration compliance status for each monitoring frequency, the configuration compliance status may be checked in units of multiple time spans, for example.

In the case of FIG. 6E, for example, record 555a indicates that in the time span "Span 1", the configuration compliance status of "Organization 1" is "OK", and the configuration compliance rate is "99.9%". Note that the time span "Span 1" means that the data of "Span 1-XX" in the soundness verification results 553 of FIG. 6C were aggregated.

In addition, record 555b in FIG. 6E indicates that in the time span "Span 1", the configuration compliance status of "Organization 1" is "NG" and the configuration compliance rate is "50%". Note that, as illustrated in FIG. 6E, the compliance status 5552 of the record stores the reason why the compliance status is "NG" in this example: "One node is missing" in JSON format.

FIG. 6F is an example of capacity information 556. Capacity information 556 includes information indicating the range and upper limit of resources that each organization can provide. As illustrated in FIG. 6F, the illustrated capacity information 556 includes one or more records having items such as an organization ID 5561 and ready nodes 5562.

Of the above items, the organization ID 5561 stores the organization ID.

The ready nodes 5562 stores information indicating the range and upper limit of resources that the organization can provide for the consortium. In the present example, the number of distributed ledger nodes 3 is stored in the ready nodes 5562. Note that the ready nodes 5562 may also include, for example, information on the specifications illustrated in FIG. 6D.

Figure 6G:
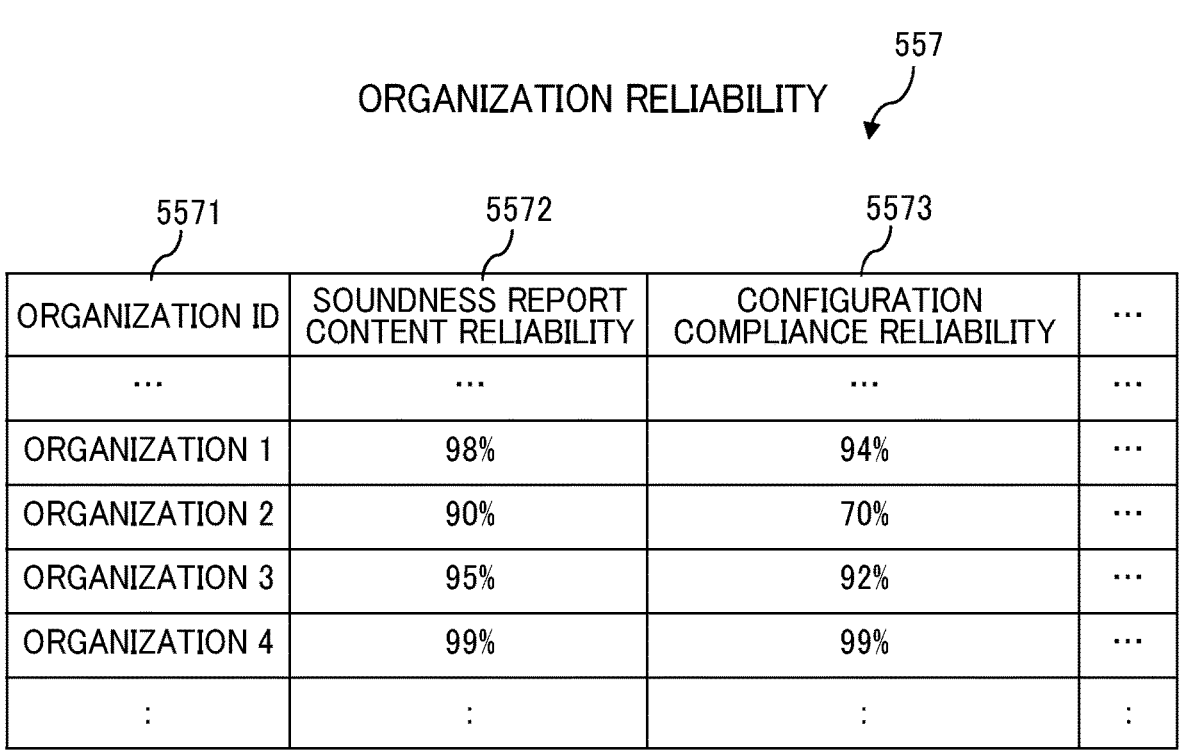
FIG. 6G is an example of state information (organization reliability).

FIG. 6G is an example of the organization reliability 557. The organization reliability 557 includes information indicating the reliability of each organization involved in soundness monitoring. As illustrated in FIG. 6G, the illustrated organization reliability 557 includes one or more records having items such as an organization ID 5571, a soundness report content reliability 5572, and a configuration compliance reliability 5573.

Of the above items, the organization ID 5571 stores the organization ID.

The soundness report content reliability 5572 stores information quantitatively indicating how reliable the soundness monitoring results reported by the organization are (hereinafter also referred to as "soundness report content reliability"). In the present example, the soundness report content reliability 5572 stores a value expressing the degree of coincidence with the report content of other organizations as a percentage.

The configuration compliance reliability 5573 stores information quantitatively indicating how reliable the organization is in terms of configuration compliance (hereinafter also referred to as "configuration compliance reliability"). Note that, similar to the configuration compliance rate 5553 illustrated in FIG. 6E, the configuration compliance reliability may be understood using a time span. In addition, for example, the configuration compliance reliability may be found based on the cumulative value of the configuration compliance rate over a predetermined period in the past.

Figure 6H:
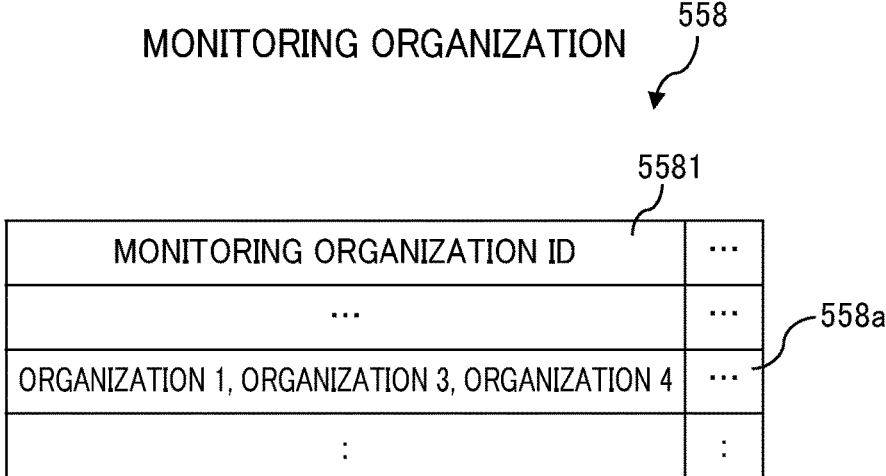
FIG. 6H is an example of state information (monitoring organization).

FIG. 6H is an example of the monitoring organization 558. The monitoring organization 558 stores information indicating an organization responsible for monitoring the soundness of distributed ledger nodes 3 of other organizations. As illustrated in FIG. 6H, the illustrated monitoring organization 558 includes a plurality of records having items such as monitoring organization ID 5581.

The monitoring organization ID 5581 stores a list of organization IDs of organizations responsible for soundness monitoring reports. Records indicated by reference numeral 558a in FIG. 6H indicate that "Organization 1", "Organization 3", and "Organization 4" are organizations that monitor and report soundness.

Figure 7:
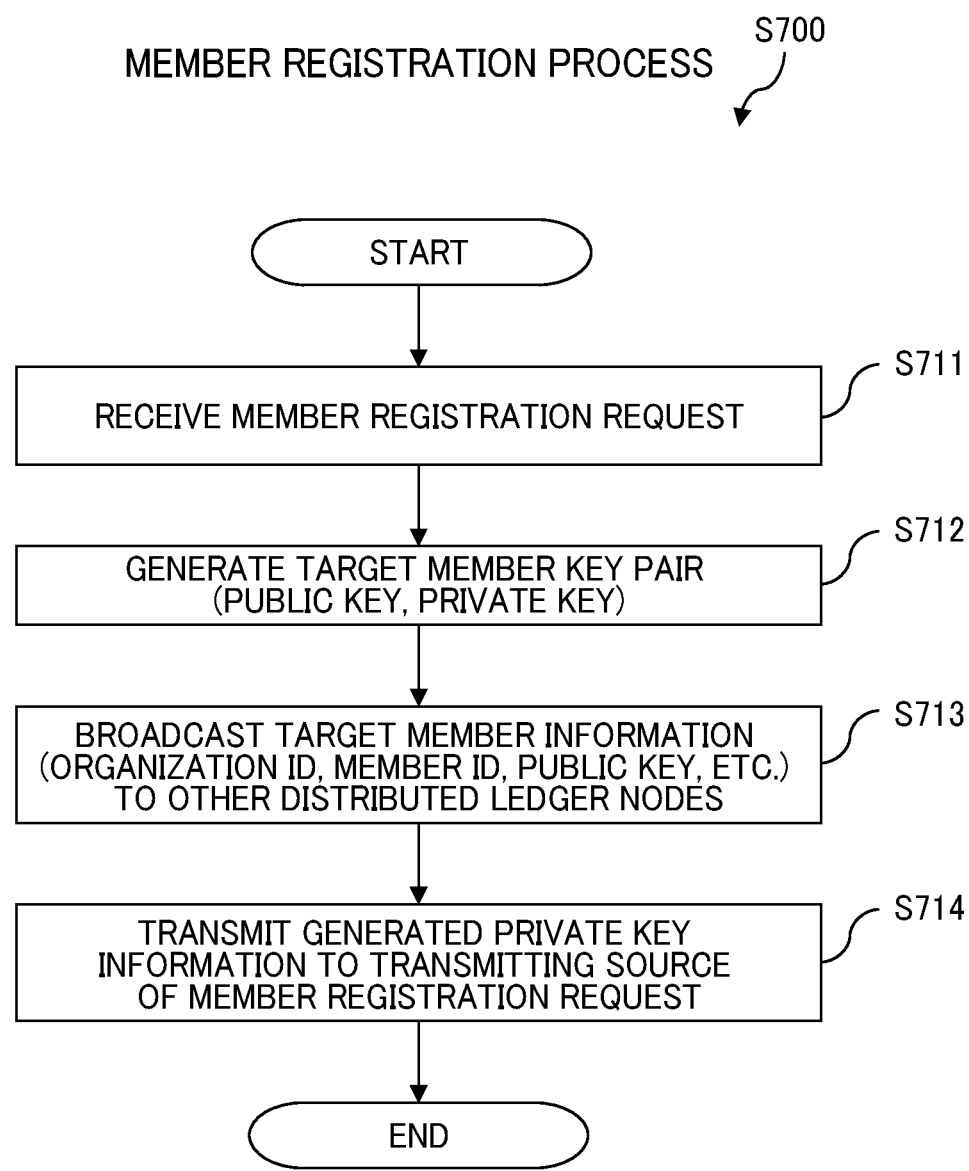
FIG. 7 is a flowchart illustrating a member registration process.

FIG. 7 is a flowchart illustrating a process (hereinafter referred to as "member registration process S700") performed by the distributed ledger node 3 when registering a member participating in the distributed ledger network. The member registration process S700 will be described below with reference to FIG. 7.

First, the member management unit 350 receives a member registration request (hereinafter referred to as a "member registration request") from the client node 4 or the like (S711). The member registration request includes the organization ID of the organization to which the member to be registered (hereinafter referred to as "target member") belongs and the member ID of the target member.

Next, the member management unit 350 creates a pair of a private key and a public key (hereinafter, a pair of a private key and a public key of the private key is referred to as a "key pair") for the target member specified in the member registration request, and associates the generated key pair with the member ID (S712).

Next, the member management unit 350 broadcasts the target member's information (organization ID, member ID, and the like) and the public key of the key pair to other distributed ledger nodes 3 (S713). Other distributed ledger nodes 3 that have received the broadcast manage the received information as participating member management information 303.

Next, the member management unit 350 transmits the private key D31 of the key pair generated in S712 to the other distributed ledger nodes 3 that transmitted the member registration request in S711 (S714). The other distributed ledger nodes 3 that have received the private key D31 manage the received private key D31 as their own private key D31 in the participating member management information 303.

Note that, although the member management unit 350 has been described above as a function of the distributed ledger node 3, the member management unit 350 may also be implemented in other nodes such as the client node 4 or a node dedicated to member management.

In the present embodiment, the key pair generated in S712 is used to authenticate members participating in the distributed ledger network, sign various transactions (TX), control SC execution authority, and the like. For example, the client node 4 issues a transaction (TX) that has been electronically signed with a private key, and the distributed ledger node 3 that verifies the transaction verifies the electronic signature using the public key corresponding to the private key to verify the identity. A method for generating a key pair, a method for verifying an electronic signature, a method for associating a member ID with a key pair, and the like are performed using, for example, publicly known techniques or well-known techniques.

Figure 8:
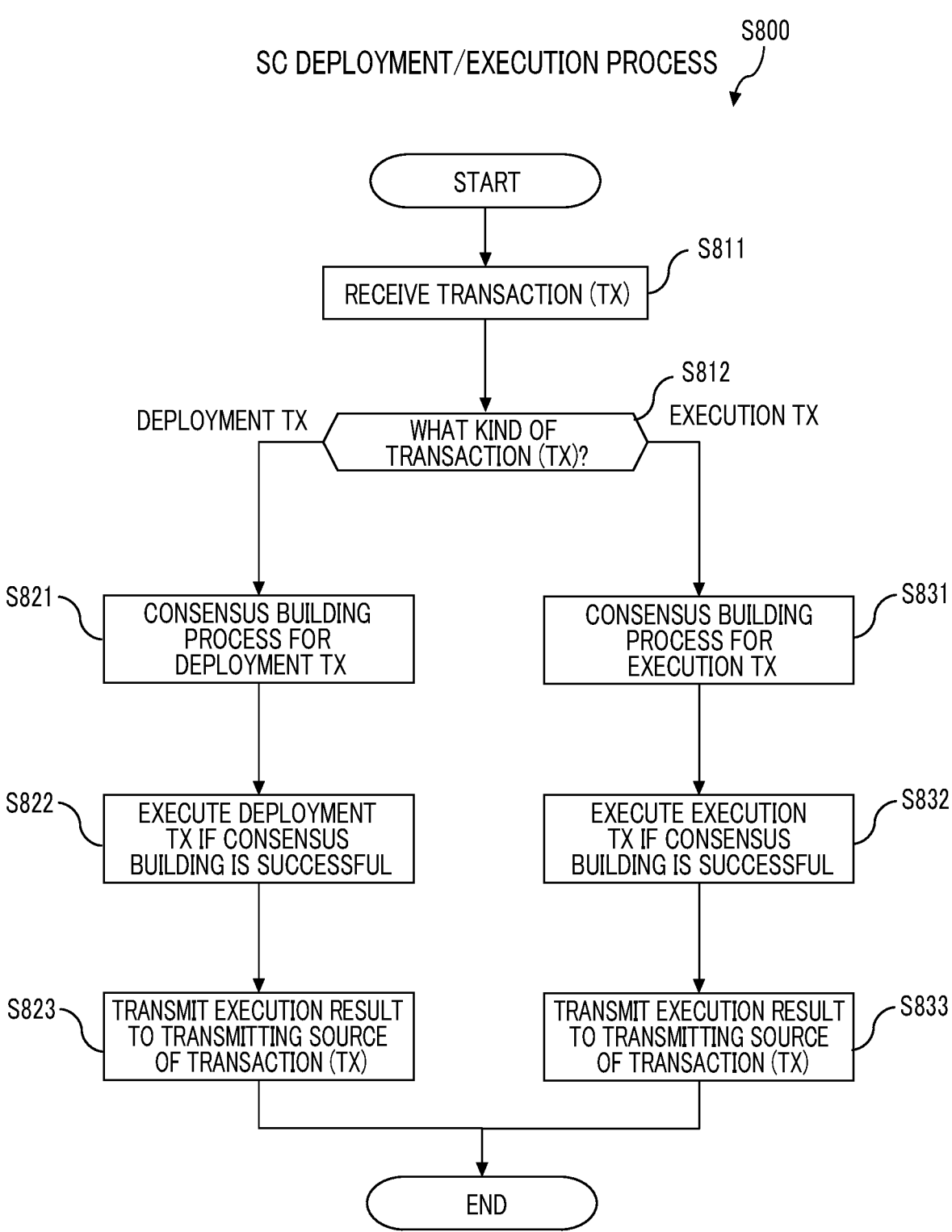
FIG. 8 is a flowchart illustrating a SC deployment/execution process.

FIG. 8 is a flowchart illustrating a process (hereinafter referred to as "SC deployment/execution process S800") performed by the distributed ledger node 3 when deploying a smart contract (SC) to the distributed ledger 310 of the distributed ledger node 3 or when executing a smart contract (SC). The SC deployment/execution process S800 will be described below with reference to FIG. 8.

First, the TX management unit 320 receives a transaction (TX) for deploying or executing a smart contract (SC) from another node such as the client node 4 (S811).

Next, the consensus management unit 325 of the distributed ledger node 3 determines whether the received transaction (TX) is a deployment TX or an execution TX (S812). When the received transaction (TX) is a deployment TX (S812: deployment TX), the process advances to S821. When the received transaction (TX) is an execution TX (S812: execution TX), the process advances to S831.

In S821, the consensus management unit 325 performs a process for building a consensus with other distributed ledger nodes 3 regarding the execution of the received deployment TX and addition to the BC 311 (hereinafter referred to as a "consensus building process") (S821). Note that consensus building is performed using, for example, a known technique or a well-known technique. For example, in the "Endorser-Orderer model" disclosed in Non-Patent Document 3, consensus building is performed in the following steps.

First, the consensus management unit 325 selects distributed ledger nodes 3 with approval authority from among the distributed ledger nodes 3 (including itself) participating in the distributed ledger network, and shares the deployment TX with each of the selected distributed ledger nodes 3. Each of the selected distributed ledger nodes 3 verifies (verification of falsification, verification of validity, and the like) whether or not the shared deployment TX has a problem.

The consensus management unit 325 acquires a verification result ("approval" or "disapproval") from each of the selected distributed ledger nodes 3, and applies the verification result of each distributed ledger node 3 to a preset consensus condition (for example, approval from two or more organizations) to determine whether or not to accept the deployment TX. Then, the consensus management unit 325 transmits the determined result to all of the distributed ledger nodes 3 participating in the distributed ledger network.

Note that in this way, in consensus building based on the "Endorser-Orderer model", there is no need for all distributed ledger nodes 3 participating in the distributed ledger network to verify transactions (TX), and transactions (TX) may be verified efficiently.

Once a consensus is reached, the TX distribution unit 36 (of the distributed ledger node 3) broadcasts the deployment TX to all distributed ledger nodes 3 participating in the distributed ledger network. Then, the SC execution management unit 330 of the distributed ledger node 3 that has received the above deployment TX executes the received deployment TX and deploys a smart contract (SC) related to the deployment TX to the distributed ledger 310 (S822). Note that the deployment is performed by registering the SC_ID and the entity of the smart contract (SC) as state information in the distributed ledger 310 based on the contents of the deployment TX, and adding the block of the relevant deployment TX to the end of the blockchain (BC) (BC 311).

Next, the consensus management unit 325 transmits the execution result of the deployment TX to the sender of the deployment TX (S823).

On the other hand, in S831, the consensus management unit 325 performs a similar consensus building process as in S821 regarding the execution TX. Once a consensus is reached, the approved TX distribution unit 335 broadcasts the execution TX to all distributed ledger nodes 3 participating in the distributed ledger network. The SC execution management unit 330 of the distributed ledger node 3 that has received the execution TX executes the smart contract (SC) specified by the execution TX (S832). Note that the smart contract (SC) is executed by specifying a call function specified in the execution TX and providing input arguments to the smart contract (SC) specified in the execution TX. By executing the above smart contract (SC), the contents of the distributed ledger 310 are updated, and the block of the execution TX is added to the end of the blockchain (BC) (BC 311).

Next, the consensus management unit 325 of the distributed ledger node 3 transmits the execution result of the execution TX to the transmission source of the execution TX (S833).

Figure 9:
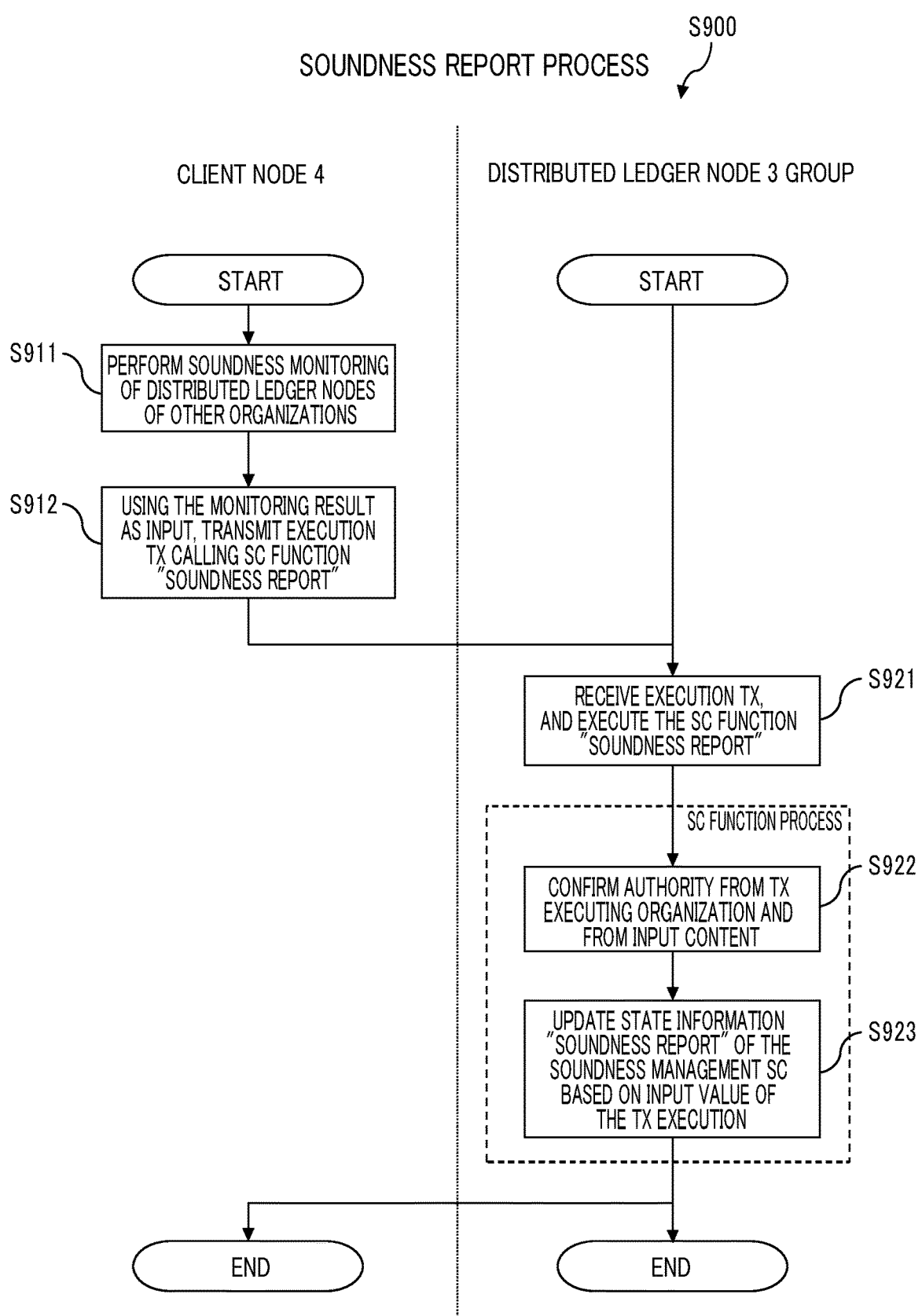
FIG. 9 is a flowchart illustrating a soundness report process.

FIG. 9 is a flowchart for explaining processing performed in the distributed ledger system 1 when an organization's client node 4 monitors the soundness of another organization's distributed ledger node 3 and reports the results to the distributed ledger node 3 (hereinafter referred to as "soundness report process S900") Hereinafter, the soundness report process S900 will be explained with reference to FIG. 9. Note that it is assumed that the smart contract (SC) to be executed in the soundness report process S900 has already been deployed to each distributed ledger node 3 before the process is executed.

The monitoring agent 435 of the client node 4 monitors the soundness of the distributed ledger node 3 of another organization using the method specified by the soundness monitoring method definition 551 of the state information 312 (S911).

For example, the monitoring agent 435 cooperates with the node search unit 425 according to one of the soundness monitoring method definitions 551 illustrated in FIG. 6A to acquire information indicating whether each distributed ledger node 3 existing in the distributed ledger network is currently available, determines the soundness based on the acquired information, and uses the result as the soundness monitoring result.

Next, the client node 4, using the S911 soundness monitoring results as input, transmits (issues) an execution TX that calls (gives an instruction for execution of) the SC function "soundness report 511" of the soundness management SC 314 to the distributed ledger node 3 (S912).

When the distributed ledger node 3 receives the above-mentioned soundness monitoring result and execution TX, the SC execution management unit 330 executes the SC function "soundness report 511" with the received soundness monitoring result as input according to the execution TX (S921).

In the processing of the SC function "soundness report 511", the distributed ledger node 3 first, based on the received execution TX and information received accompanying the execution TX (information on the organization of the sender of the execution TX, and the like), confirms whether the organization has the authority to report the soundness of the organization (S922). After confirming that the organization has the above-described authority, the distributed ledger node 3 adds the soundness monitoring results received from the client node 4 to the soundness monitoring results 552 of the state information 312 (S923).

For example, the information in the four records indicated by codes 552a to 552d in the soundness monitoring result 552 in FIG. 6B, is information added when the soundness report 511 is executed by the execution TX transmitted from the client node 4 of "Organization 1." These records store the soundness monitoring results of the distributed ledger nodes 3 of the other organizations "Organization 2" and "Organization 3" as the soundness monitoring results in the time span "Span 1-1".

Note that access to reports of soundness monitoring results from each organization may be restricted, for example, so that other organizations other than the organization that made the report cannot overwrite them (for example, access is restricted using the method of "ABAC, State Endorsement" in Non-Patent Document 3).

Figure 10:
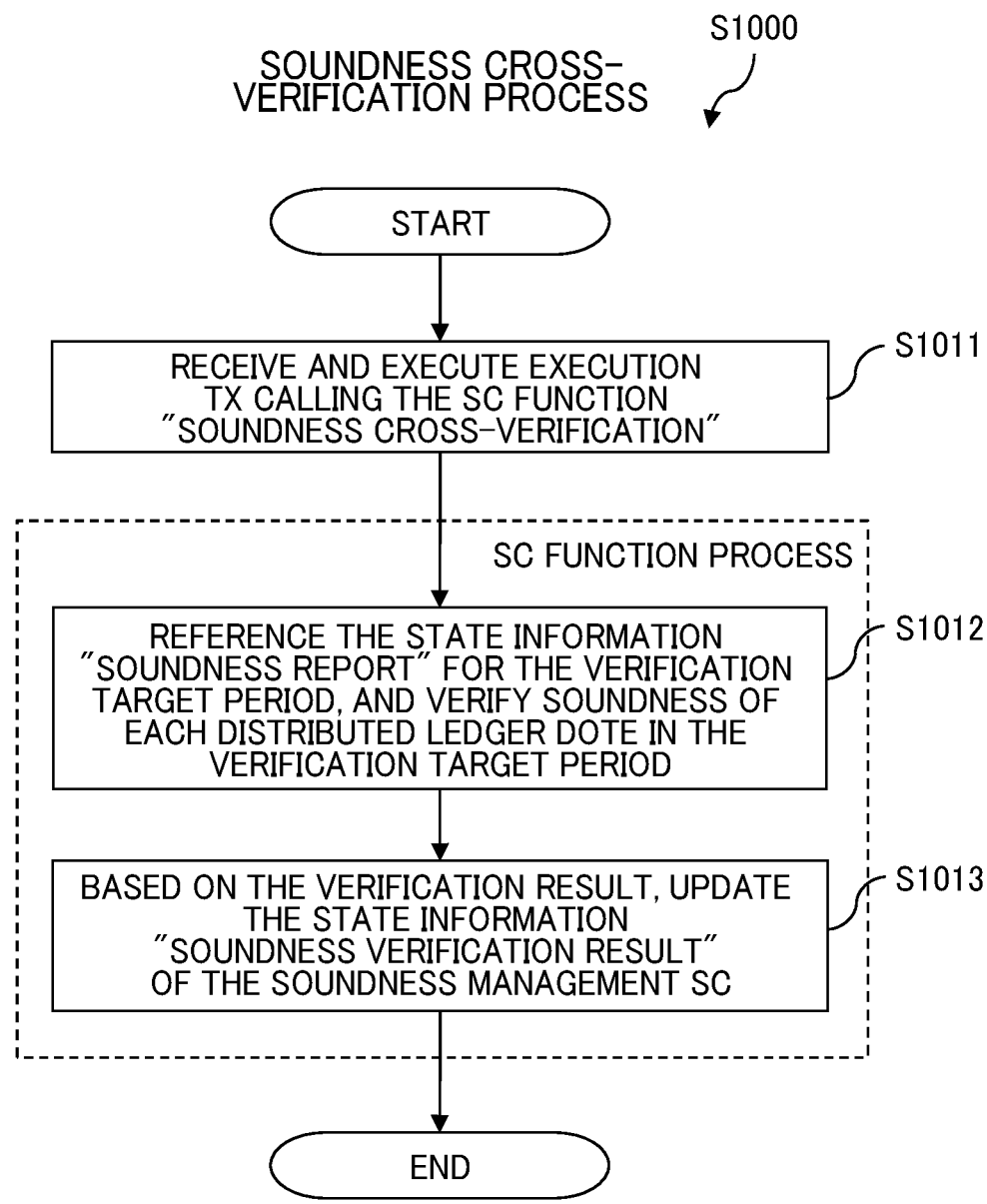
FIG. 10 is a flowchart illustrating a soundness cross-verification process.

FIG. 10 is a flowchart for explaining processing performed by the distributed ledger node 3 when the client node 4 transmits an execution TX that calls the SC function "soundness cross-verification 512" of the soundness management SC illustrated in FIG. 5 to the distributed ledger node 3 (referred to as "soundness cross-verification process S1000"). The soundness cross-verification process S1000 will be described below with reference to FIG. 10.

When the distributed ledger node 3 receives the above execution TX, the SC execution management unit 330 executes the SC function "soundness cross-verification 512" of the soundness management SC (S1011).

In the processing of the SC function "soundness cross-verification 512", the distributed ledger node 3 refers to the state information "soundness monitoring results 552" for the verification target period (time span) and verifies the soundness of the distributed ledger node 3 in the verification target period (S1012).

Note that the above verification target period may be based on, for example, information received from the client node 4 accompanying the execution TX, or may be automatically determined from the current date and time. In addition, verification target period may be all verifiable periods.

For example, in the soundness monitoring result 552 of FIG. 6B, for the distributed ledger node 3 of "Node 1" of organization 2 in the time span where the time span 5525 is "Span 1-1", "OK" is stored in the monitoring result 5523 for both "organization 1" and "organization 3". In this case, in a case where the reports from other participating organizations are also "OK", the determination criterion 5514 "SC consensus condition" (here, SC consensus condition 3026 "approval of more than half of participating organizations" for business ID 3025 of "Business A" in FIG. 4B) is satisfied, and according to the determination method 5515 "majority vote", the soundness verification result is "OK".

Returning to FIG. 10, in the process of the subsequent SC function "soundness cross-verification 512", the distributed ledger node 3 adds or updates the soundness verification result to the "soundness verification result 553" of the state information 312 (S1013). For example, in a case where the soundness verification result 553 has the content illustrated in FIG. 6B, "Span 1-1: OK" is added as the soundness verification result history 5532 to the record of "Node 1" of "Organization 2" in the soundness verification result 553 in FIG. 6C.

Note that, although the case where the soundness cross-verification process S1000 is performed in response to the transmission (issuance) of the execution TX of the SC function "soundness cross-verification 512" from the client node 4 of a certain organization has been described above, the soundness cross-verification process S1000 may be executed using another event as a trigger. For example, when the soundness report process S900 is performed by the SC function "soundness report 511", whether the distributed ledger node 3 has been able to acquire a report indicating that the criteria is satisfied for determining whether soundness verification is possible for the verification period may be determined, and in a case where it is determined that the data has been acquired, the SC function "soundness cross-verification 512" may be executed subsequently. In addition, the soundness cross-verification process S1000 may be executed when a predetermined SC event occurs.

Figure 11:
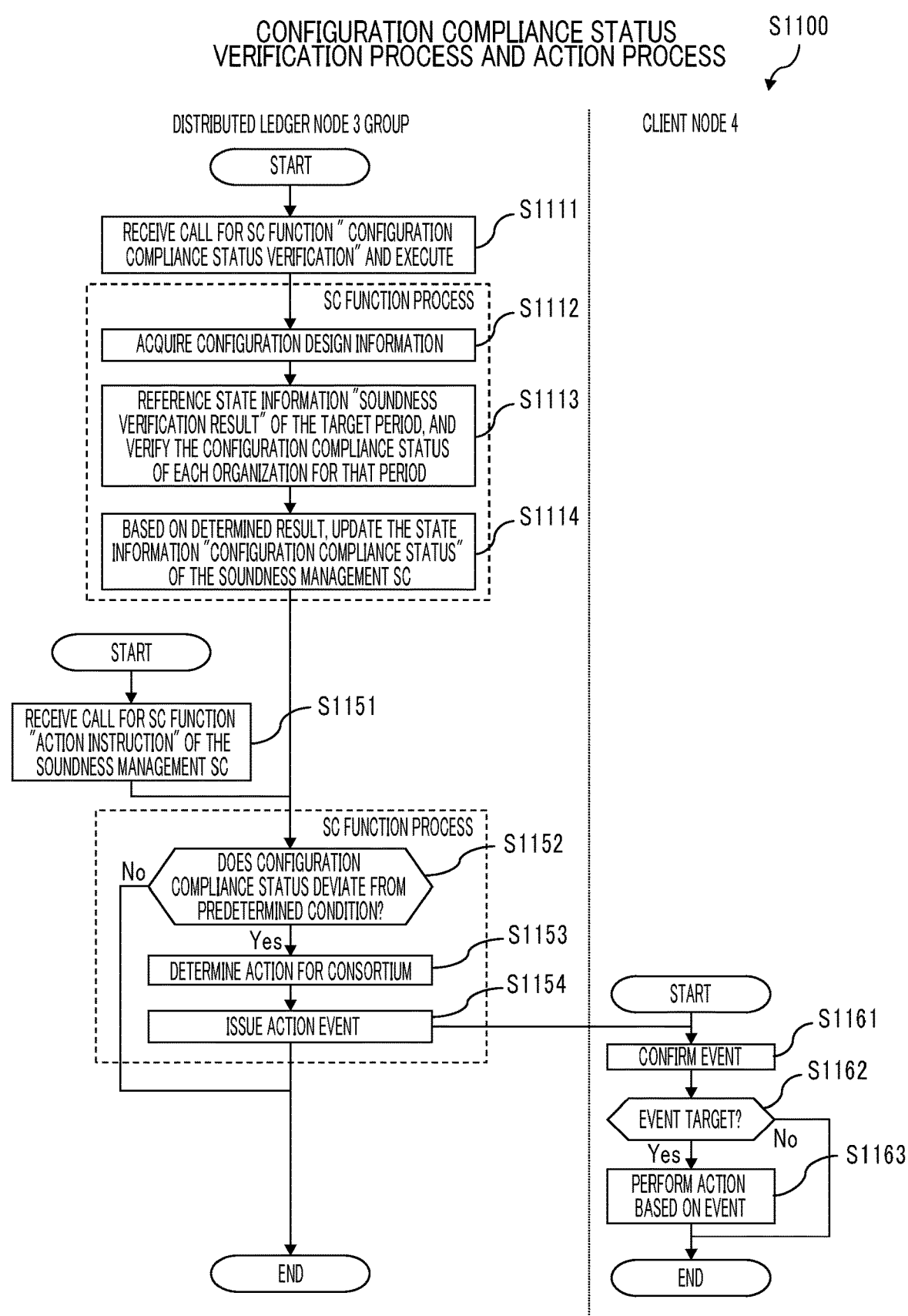
FIG. 11 is a flowchart illustrating a configuration compliance status verification process.

FIG. 11 is a flowchart illustrating a process performed by the distributed ledger node 3 in a case where the execution TX of the SC function "configuration compliance status verification 513" of the soundness management SC 314 in FIG. 5 is transmitted from the client node 4 to the distributed ledger node 3 of the distributed ledger node 3 group (hereinafter, this will be referred to as the "configuration compliance status verification process S1100"), and a process performed by the distributed ledger node 3 when execution TX of the SC function "action instruction 514" is transmitted (hereinafter, this will be referred to as the "action process S1150"). The configuration compliance status verification process S1100 and the action process S1150 will be described below with reference to FIG. 11.

First, the processes of S1111 to S1114, which correspond to the configuration compliance status verification process S1100, will be described.

Each distributed ledger node 3 of the distributed ledger node 3 group receives a call for the SC function "configuration compliance status verification 513" of the soundness management SC 314 as an execution TX, and the SC execution management unit 330 of each distributed ledger node 3 executes the SC function "configuration compliance status verification 513" according to the received execution TX (S1111).

In the process of the SC function "configuration compliance status verification 513", the distributed ledger node 3 first acquires the configuration design information 554 (S1112). Note that the SC function "configuration compliance status verification 513" acquires the configuration design information 554 using, for example, a data reference function.

In the process of the subsequent SC function "configuration compliance status verification 513", the distributed ledger node 3 references the state information 312 "soundness verification result 553" in the verification period (time span), and verifies the configuration compliance status of each organization during the verification target period (S1113).

Note that the above-mentioned verification target period is specified by, for example, input information from the execution TX. In addition, the above-mentioned verification target period may be automatically determined by the distributed ledger node 3 based on the current date and time, for example. Moreover, for example, all periods in which the distributed ledger node 3 is unverified may be set as the above-mentioned verification target period.

The configuration compliance status of the distributed ledger node 3 can be determined, for example, by determining the soundness of the distributed ledger node 3 during the target period from the percentage of the period in which it was normal, and the configuration compliance rate is calculated from the difference between the number of distributed ledger nodes 3 whose soundness was normal during the target period and the prepared nodes 5542 of the configuration design information 554. A specific explanation will be given using the soundness verification result 553 in FIG. 6C and the configuration design information 554 in FIG. 6D as examples.

First, from the soundness verification result 553, for example, in a case where "Span 1 (Span 1-X)" is the verification target period, the soundness verification result of "Node 1" of "Organization 1" is "OK in Span 1-1", OK in Span 1-2, OK in Span 1-3 . . . ", and thus the soundness of "Node 1" of "Organization 1" in the time span of "Span 1" is "3÷3=100%". In addition, similarly, the soundness of "Node 2" of "Organization 1" is "100%".

Here, when compared with the configuration design information 554, for "Organization 1", the prepared nodes 5542 are "2 nodes", and from the soundness verification result 553, it was confirmed that the soundness of the two nodes "Node 1" and "Node 2" was "100%" (normal) during the verification period, and thus the compliance status during the verification period is "OK", and the compliance rate during the verification period is "100%".

In addition, the soundness verification result of distributed ledger node 3 of "Node 1" of "Organization 2" is "OK in Span 1-1, OK in Span 1-2, OK in Span 1-3 . . . ", and thus the soundness of "Node 1" of "Organization 2" in the time span of "Span 1" is "3÷3=100%". On the other hand, the soundness of "Node 2" of "Organization 2" is 0÷3, which is "0%".

Here, when compared with the configuration design information 554, for "Organization 2", the prepared nodes 5542 are "2 nodes", and from the soundness verification result 553, the soundness of "Node 2" is "0%", and the compliance status during the verification period is "NG", and the reason for this is that "one node is missing". Further, the configuration compliance rate is "100%+0%"/2=50%.

Returning to FIG. 11, in the process of the subsequent SC function "configuration compliance status verification 513", the distributed ledger node 3 adds (updates) the verification result to the state information 12 "configuration compliance status" of the soundness management SC 314 (S1114).

Note that, although the case where the distributed ledger node 3 executes the configuration compliance status verification process S1100 triggered by receiving the execution TX of the SC function "configuration compliance status verification 513" has been described above, the configuration compliance status verification process S1100 may be executed in response to other events. In addition, the configuration compliance status verification process S1100 may be executed according to a preset target period or execution frequency, such as the monitoring frequency 5513 illustrated in FIG. 6A. Moreover, for example, the SC function "configuration compliance status verification 513" may be executed subsequent to the SC function "soundness cross-verification 512". Furthermore, the SC function "configuration compliance status verification 513" may be executed in response to the occurrence of an SC event.

Next, the processes of S1151 to S1154 and S1161 to S1163, which correspond to the action process S1150, will be explained with reference to FIG. 11.

When each distributed ledger node 3 receives an execution TX that calls the SC function "action instruction 514" of the soundness management SC as an execution TX (S1151), the SC execution management unit 330 executes the SC function "action instruction 514" according to the received execution TX. Note that the SC function "action instruction 514" may be automatically executed by the distributed ledger node 3 subsequent to the SC function "configuration compliance status verification 513".

In the process of the SC function "action instruction 514", the distributed ledger node 3 first determines whether the current configuration compliance status deviates from a predetermined condition (S1152). Examples of the above-mentioned condition include that the configuration compliance status continues to be "NG" for a certain period of time, that the configuration compliance rate of all or any organization is below a predetermined threshold, and the like.

In S1152, in a case where the current configuration compliance status does not deviate from the predetermined condition (S1152: No), the action process S1150 ends. On the other hand, in a case where the current configuration compliance status deviates from the predetermined condition (S1152: Yes), the SC function "action instruction 514" determines an action (for example, "request for configuration review", "impose penalty", or the like) toward the participating organizations of the consortium according to the current status (S1153).

In the configuration compliance status 555 in FIG. 6E, there is a shortage of one distributed ledger node 3 of "Organization 2" in "Span 1", and the configuration compliance status 555 deviates from the configuration design information 554. Therefore, the SC function "action instruction 514" determines and issues an action for the consortium as follows.

First, the distributed ledger node 3 reviews the configuration and decides to add one missing node to the consortium. In addition, the distributed ledger node 3 refers to the capacity information 556 in order to select an organization that will prepare the node. Here, for example, when the capacity information 556 in FIG. 6F is compared with the configuration design information 554 in FIG. 6D, it can be seen that each of "Organization 1", "Organization 3", and "Organization 4" has room for one ready node 5562. Therefore, distributed ledger node 3 decides to issue an action requesting "organization 4", which currently has the least number of prepared nodes 5542, to provide a distributed ledger node 3 to the consortium instead of "organization 2". On the other hand, the distributed ledger node 3 decides to issue an action to impose a penalty (payment of loss amount during "Span 1" period, or the like) on "Organization 2" for not being able to prepare the configuration specified in configuration design information 554. The distributed ledger node 3 generates an action event that instructs an action beyond the action decided to be issued, and stores the generated action event as an action event 581 in the SC event 222 (S1154).

The monitoring agent 435 of the client node 4 monitors the SC event 222 at any time. When the monitoring agent 435 detects the occurrence of the above action event 581 (S1161), the monitoring agent 435 confirms whether its own organization is the target organization of the action event 581 (S1162). In a case where its own organization is the target organization of the action event 581 (S1162: YES), the client node 4 executes the process corresponding to the action event 581 according to the content instructed by the action event 581 (S1163). The monitoring agent 435 reports the results of processing the action event 581 to the consortium, for example, via the soundness management SC 314, as necessary.

For example, when each organization confirms the occurrence of an action event 581 for its own organization, each organization takes actions according to the content of the action event 581, such as adding a distributed ledger node 3 to the consortium, and reports the results to the distributed ledger node 3. Note that, after receiving the above report, the distributed ledger node 3 updates the configuration design information 554 (for example, adds one prepared node for "organization 4" and decreases one prepared node for "organization 2", and the like). This allows the configuration of the consortium to be corrected. Note that, after receiving the action event 581, the organization 2 pays the loss amount corresponding to the penalty to the consortium, for example, in virtual currency.

As described above, with the distributed ledger system 1 of the present embodiment, objectivity can be ensured by having (a plurality of) other organizations perform/verify soundness monitoring (correctness of configuration/life and death).

In addition, as described above, by performing predetermined processing using a smart contract (SC), the soundness monitoring result of each organization can be aggregated on-chain and then analyzed and processed. Therefore, it is possible to eliminate a single point of trust and provide evidentiary value.

Moreover, the distributed ledger system 1 of the present embodiment has an effect of making it possible to collect information across organizations and to take actions based on reliable evidence.

Second Embodiment

Next, a distributed ledger system 1 of a second embodiment will be described. Note that the basic configuration of the distributed ledger system 1 of the second embodiment is the same as that of the distributed ledger system 1 of the first embodiment, and thus the following description will focus on the differences from the first embodiment.

In addition to the configuration of the distributed ledger system 1 of the first embodiment, the distributed ledger system 1 of the second embodiment finds the reliability of each organization (hereinafter referred to as "organization reliability) based on the contents of reports and the configuration compliance status of each organization, and the results are fed back to the consortium and each organization. Moreover, the distributed ledger system 1 of the second embodiment has a configuration in which an organization that monitors the soundness of other distributed ledger nodes 3 is selected based on the organization reliability.

Figure 12:
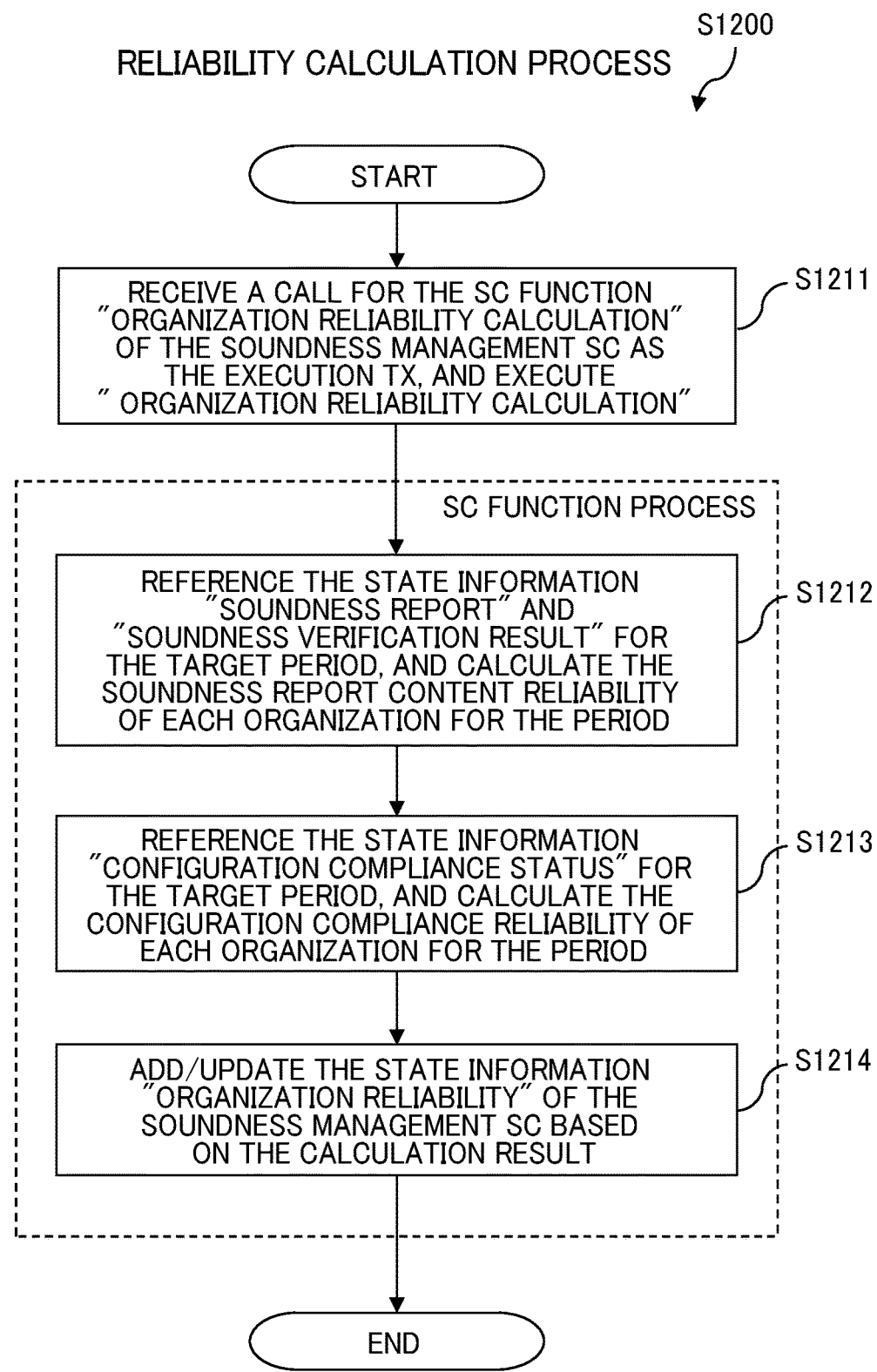
FIG. 12 is a flowchart illustrating a reliability calculation process.

FIG. 12 is a flowchart illustrating processing performed by the distributed ledger node 3 in the distributed ledger system 1 of the second embodiment when calculating the organizational reliability of each organization (hereinafter referred to as "reliability calculation process S1200"). The reliability calculation process S1200 will be described below with reference to FIG. 12.

When each distributed ledger node 3 receives an execution TX from the client node 4 that calls the SC function "organization reliability calculation 515" of the soundness management SC 314 illustrated in FIG. 5, each distributed ledger node 3 executes the SC function "organization reliability calculation 515" (S1211). Note that the client node 4 transmits (issues) the execution TX to each distributed ledger node 3 at a predetermined timing (for example, periodically).

In the process of the SC function "organization reliability calculation 515", the distributed ledger node 3 first refers to the soundness monitoring result 552 and the soundness verification result 553 of the state information 312 in a calculation target period (for example, a time span, hereinafter referred to as "calculation target period"). Then, the distributed ledger node 3 finds the reliability of the soundness monitoring content of each organization during the calculation period (hereinafter referred to as "soundness report content reliability") based on the acquired information (S1212).

The above-mentioned calculation target period may be attached to the execution TX transmitted from the client node 4 to the distributed ledger node 3, or may be automatically set from the current date and time, for example. Moreover, all periods that are not subject to calculation may be included.

For example, the soundness report content reliability can be found from the degree (percentage) of consensus between the soundness monitoring result of the organization subject to calculation in each time span and the determination results of other organizations (consensus of the entire consortium) in each time span.

In the process of the subsequent SC function "organization reliability calculation 515", the distributed ledger node 3 refers to the configuration compliance status 555 of the state information 312 in the calculation target period, and finds the degree of configuration compliance of each organization in the calculation target period (hereinafter referred to as "configuration compliance reliability") (S1213).

The configuration compliance reliability is found, for example, from the statistical values (average value, minimum value, maximum value, and the like) of the configuration compliance rate for all time spans in the calculation target period of each organization.

In the process of the subsequent SC function "organization reliability calculation 515", the distributed ledger node 3 adds (updates) information based on the soundness report content reliability found in S1212 and the configuration compliance reliability found in S1213 as the organization reliability to the organization reliability 557 of the state information 312 of the soundness management SC (S1214).

In this way, the organization reliability is determined and recorded in the state information 312, and thus it is possible to obtain an objective evaluation of the reliability of each organization.

Note that the soundness report content reliability may be used as a determination criterion and determination method for soundness cross-verification, and, for example, a possible usage pattern may be to give greater weight to reports from organizations whose soundness report content reliability is high.

In addition, the soundness report content reliability may be used in selection of an organization that monitors the soundness, and, for example, organizations with high soundness report content reliability may be selected with priority.

By utilizing the soundness report content reliability in this way, the soundness report content reliability can be expected to have an effect of increasing the accuracy of soundness monitoring.

Moreover, the configuration compliance reliability may be used when determining the content of the action event 581 described above, such as by weighting the penalty amount based on the configuration compliance reliability. This can be expected to improve the soundness of the operation of the distributed ledger system 1.

In addition, as a usage form of configuration compliance reliability, in a case where a certain organization lacks distributed ledger nodes 3, it is also conceivable that another organization whose configuration compliance reliability is higher than that of the organization concerned will be requested to provide the distributed ledger node 3.

Utilizing the configuration compliance reliability positively in this way can be expected to have an effect of promoting the maintenance and improvement of the configuration compliance rate as a consortium.

Figure 13:
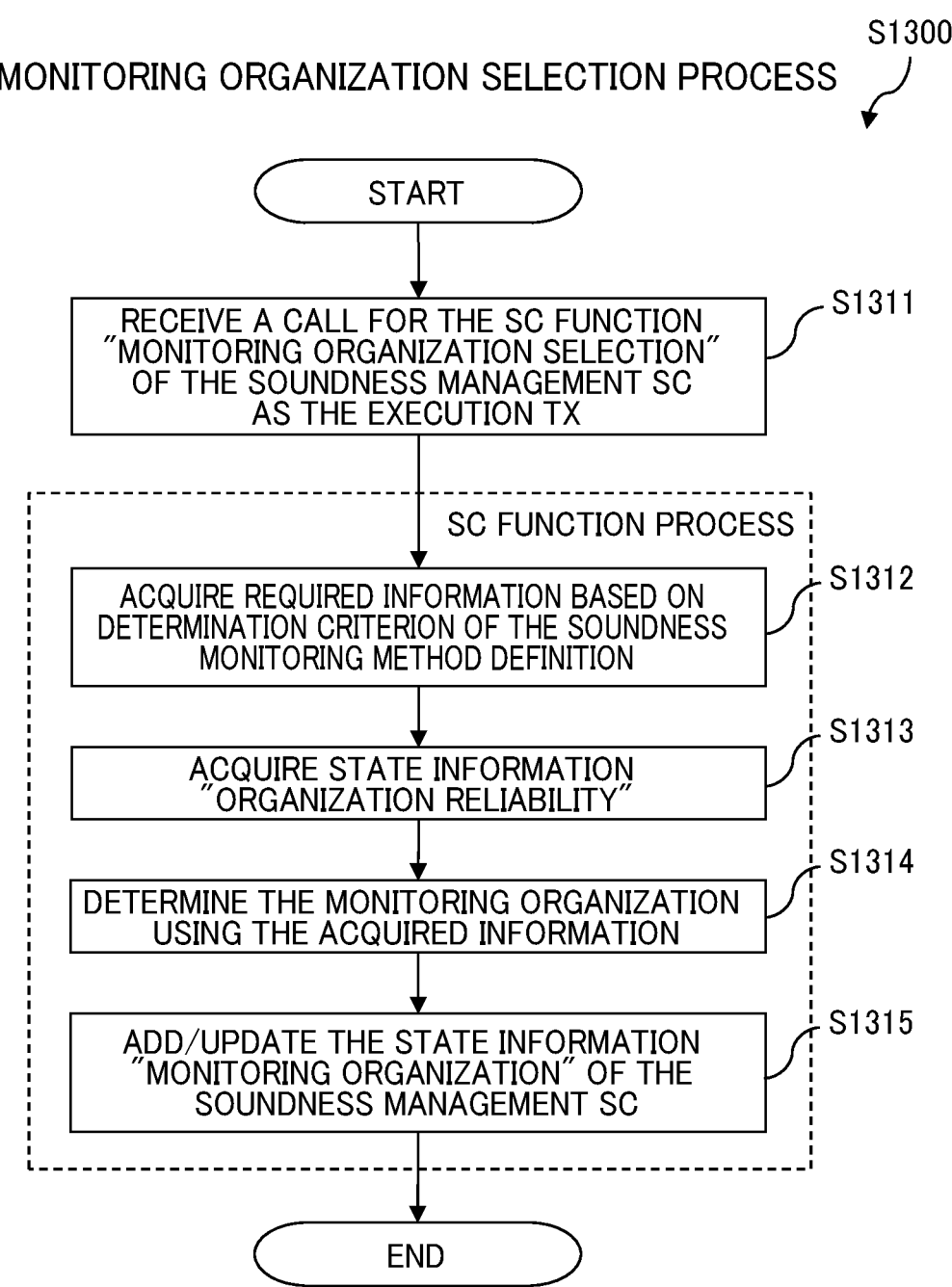
FIG. 13 is a flowchart illustrating a monitoring organization selection process.

FIG. 13 is a flowchart illustrating a process performed by the distributed ledger node 3 in the distributed ledger system 1 of the second embodiment when selecting an organization whose soundness is to be monitored (hereinafter referred to as "monitoring organization selection process S1300"). The monitoring organization selection process S1300 will be described below with reference to FIG. 13.

When each distributed ledger node 3 receives an execution TX from the client node 4 that calls the SC function "monitoring organization selection 516" of the soundness management SC 314 illustrated in FIG. 5, each distributed ledger node 3 executes the SC function "monitoring organization selection 516" (S1311). Note that the client node 4 transmits (issues) the execution TX above to each distributed ledger node 3 at an appropriate timing (for example, periodically).

In the processing of the SC function "monitoring organization selection 516", the distributed ledger node 3 first acquires information (SC consensus condition, or the like) used to select a monitoring organization based on the determination criterion 5514 of the soundness monitoring method definition 551 of the state information 312 (S1312). For example, in the above process, in a case where the "SC consensus condition" is stored in the determination criteria 5514, the distributed ledger node 3 acquires the SC consensus conditions included in the consortium information 302 stored in the storage unit 300 of the distributed ledger node 3. In this example, it is assumed that the SC consensus condition "approval from three or more organizations" is acquired.

In the process of the subsequent SC function "monitoring organization selection 516", the distributed ledger node 3 acquires the organization reliability 557 of the state information 312 (S1313).

Next, in the above process, the distributed ledger node 3 determines the monitoring organization using the information acquired in S1312 and S1313 (S1314). For example, the distributed ledger node 3 selects three organizations to at least satisfy the SC consensus conditions. For example, in a case where the organization reliability 557 is as illustrated in FIG. 6G, the SC function "monitoring organization selection 516" selects "Organization 1", "Organization 3", and "Organization 4" in order of the highest soundness report content reliability 5572.

In the process of the subsequent SC function "monitoring organization selection 516", the distributed ledger node 3 adds (updates) the selected organization to the monitoring organization 558 of the state information 312 (S1315).

For example, the monitoring agent 435 of the client node 4 of each organization acquires the monitoring organization 558 via the soundness management SC 314, and in a case where itself is selected as the monitoring organization, it monitors the soundness of other organizations and reports to the distributed ledger node 3.

In addition, for example, the soundness management SC 314 uses the information of the monitoring organization 558 to confirm whether the organization has authority in S922 of FIG. 9.

Note that, in the above, organizations that meet the minimum determination criterion 5514 (SC consensus conditions) are selected; however, a slightly larger number of organizations may be selected by having some margin. By doing so, for example, in a case where there are only organizations with low soundness report content reliability, it is possible to reduce the risk of a shortage of monitoring organizations.

As described above, by selecting the minimum necessary number of monitoring organizations based on determination criterion for soundness monitoring (especially consensus conditions for a distributed ledger system such as SC consensus conditions), it is possible to both ensure the objectivity of monitoring the soundness of the distributed ledger node 3 and to improve the efficiency of the resource amount and processing amount.

Providing Information Regarding Soundness

The distributed ledger system 1 described above includes a mechanism for providing information managed in the distributed ledger 310 of the distributed ledger node 3 to users at any time. The above mechanism may directly access the distributed ledger 310 to acquire the above information, or the above information may be acquired using a smart contract (SC) deployed to the distributed ledger node 3 (distributed ledger 310) like the soundness management SC 314. In addition, the mechanism for providing the above information may be provided in the distributed ledger node 3 and the client node 4, or may be provided in a node other than these (such as a web server).

Figure 14:
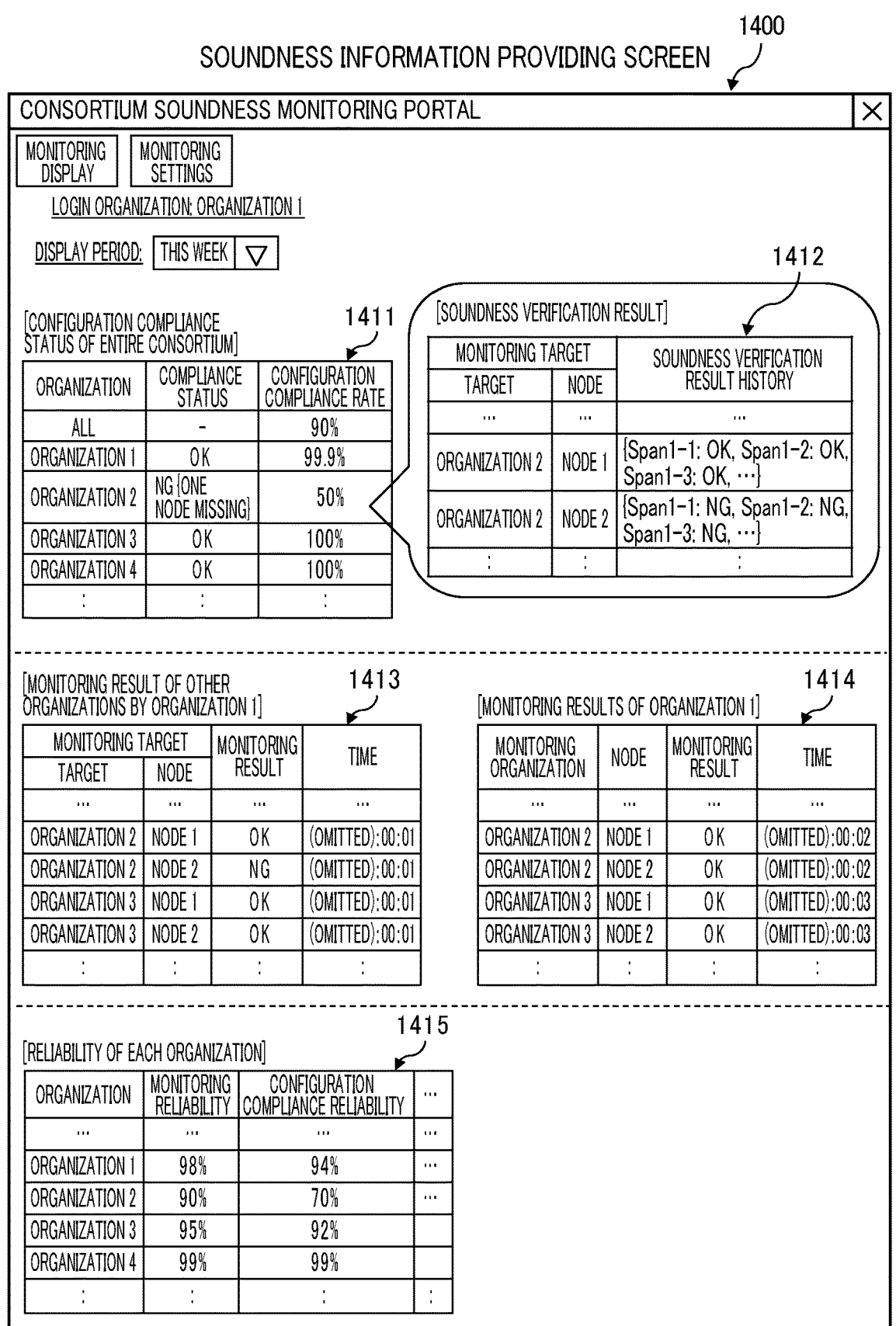
FIG. 14 is an example of a monitoring result display user interface.

FIG. 14 is an example of a screen (hereinafter referred to as "soundness information providing screen 1400") that is presented to the user by an information processing apparatus that provides the above information. The illustrated soundness information providing screen 1400 displays information that focuses on the organization whose organization ID is "Organization 1" during login.

The illustrated soundness information providing screen 1400 displays the configuration compliance status 1411 of each organization, the soundness verification result history 1412, the soundness monitoring results 1413 of other organizations by the organization, and the soundness monitoring results 1414 of the organization by other organizations, the organization reliability 1415 of each organization participating in the consortium, and the like.

In this way, users of each organization can easily check the contents of the state information 312 via the soundness information providing screen 1400, and can use the soundness information providing screen 1400 to manage the soundness of their own organization's distributed ledger nodes 3.

Technical Effect

As described above, the distributed ledger node 3 in the distributed ledger system 1 of the embodiment receives the soundness monitoring result, which is the result of the first organization monitoring the soundness of the distributed ledger node 3 of the second organization, verifies the received soundness monitoring results by the multiple organizations, and records the soundness verification result, which is the verification result, in the distributed ledger 310. Therefore, the objective soundness verification results for the distributed ledger nodes 3 of each organization can be aggregated and managed in the distributed ledger 310, and the overall soundness of the distributed ledger system 1 can be efficiently monitored based on objective information.

In addition, the acquisition of soundness monitoring results and the verification of soundness monitoring results are performed using a smart contract (SC), and thus information regarding the soundness of each organization can be managed as on-chain information in a distributed ledger. Therefore, it is possible to eliminate a single point of trust and provide highly reliable/evidential information.

Moreover, the distributed ledger node 3, by comparing and contrasting the soundness verification results with the configuration design information of the second organization, generates configuration compliance status, which is information indicating the degree to which the organization complies with the configuration design information, and records the configuration compliance status in the distributed ledger 310. Therefore, the configuration compliance information of each organization's distributed ledger node 3 used for determining soundness can be managed and provided as highly objective information.

In addition, in a case where the configuration compliance status of the second organization does not satisfy the configuration design information, the distributed ledger node 3 records information instructing the second organization to review the configuration of the distributed ledger node 3 in the distributed ledger 310. Therefore, the second organization can recognize that it is necessary to review the distributed ledger node 3 by referring to the above information.

Moreover, in a case where the configuration compliance status of the second organization does not satisfy the configuration design information, the distributed ledger node 3 records information in the distributed ledger indicating that a penalty will be imposed on the second organization due to the insufficient configuration of the distributed ledger node 3, and thus the second organization, by referring to the information, is able to recognize that it is necessary to review the distributed ledger nodes in order to avoid penalties.

Further, the distributed ledger node 3, based on the configuration compliance status, generates the organization reliability, which is the reliability of each of a plurality of organizations, and records the organization reliability in the distributed ledger, and thus the distributed ledger node 3 is able to provide the organization reliability of each organization.

In addition, the distributed ledger node 3, based on the soundness monitoring results, generates organization reliability, which is the reliability of each of a plurality of organizations, and records the organization reliability in the distributed ledger, and thus the distributed ledger node 3 is able to provide the organization reliability of each organization.

Moreover, the client node 4 of an organization monitors the soundness of a second organization according to the soundness monitoring method definition 551 of the distributed ledger 310, and thus it is possible to prevent variations in the soundness monitoring method between organizations.

Furthermore, the distributed ledger node 3 determines the monitoring organization based on the soundness monitoring result, and thus a highly reliable organization can be selected as the monitoring organization.

In addition, the distributed ledger node 3 determines the monitoring organization based on the organizational reliability, and thus it is possible to select a highly reliable organization as the monitoring organization.

Further, the distributed ledger node 3 selects the monitoring organization according to the configuration compliance status, and thus a highly reliable organization can be selected as the monitoring organization.

Example of an Information Processing Device

Figure 15:
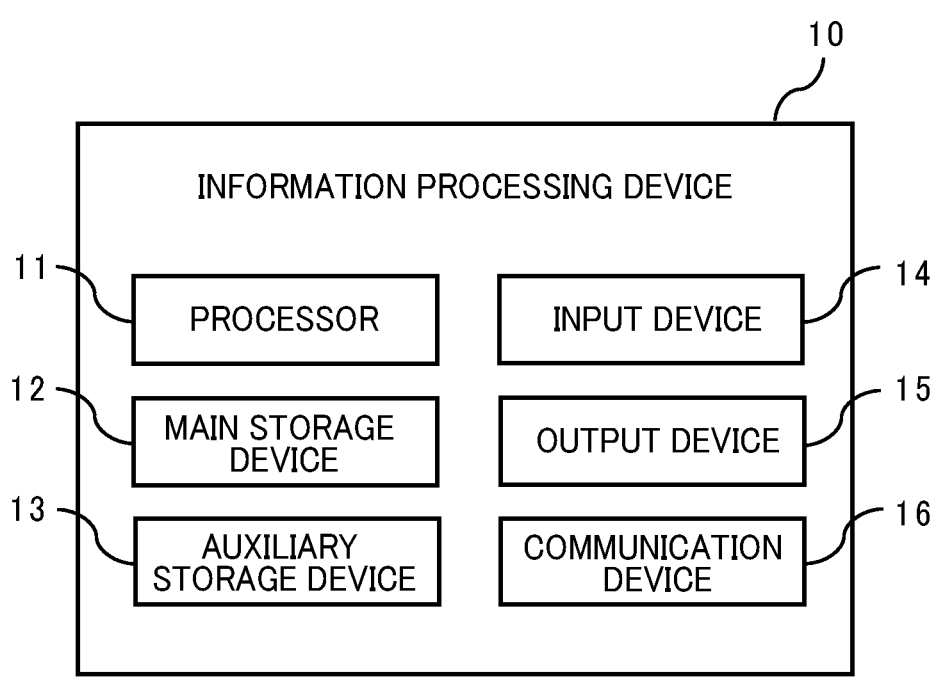
FIG. 15 is an example of an information processing device used for achieving a distributed ledger system.

FIG. 15 is an example of an information processing apparatus (computer) used to implement the distributed ledger system 1 described in the first embodiment and the second embodiment. The client node 4 and the distributed ledger node 3 are configured using, for example, the information processing apparatus 10 illustrated in FIG. 15.

The information processing apparatus 10 includes a processor 11, a main storage device 12 (memory), an auxiliary storage device 13 (external storage device), an input device 14, an output device 15, and a communication device 16. These are communicably connected via a bus, communication cable, or the like. Examples of the information processing device 10 include personal computers, various types of server devices, office computers, general-purpose machines (mainframes), smartphones, tablets, and the like.

The information processing device 10 may also be implemented in part or in whole by using, for example, virtual information processing resources provided using virtualization technology, process space separation technology, and the like, such as virtual servers provided by cloud systems. In addition, all or part of the functions provided by the information processing device 10 may be implemented by, for example, a service provided by a cloud system via an Application Programming Interface (API) or the like. Moreover, all or part of the functions provided by the information processing device 10 may be implemented using, for example, Software as a Service (SaaS), Platform as a Service (PaaS), Infrastructure as a Service (IaaS), or the like.

The processor 11 is, for example, configured by a Central Processing Unit (CPU), a Micro Processing Unit (MPU), a Graphics Processing Unit (GPU), a Field Programmable Gate Array (FPGA), an Application Specific Integrated Circuit (ASIC), an Artificial Intelligence (AI) chip, or the like.

The main storage device 12 is a device used when the processor 11 executes a program, and includes, for example, Read Only Memory (ROM), Random Access Memory (RAM), non-volatile memory (Non Volatile RAM (NVRAM)), or the like. Various functions implemented by each component of the distributed ledger system 1 are implemented by each processor 11 reading programs and data stored in the auxiliary storage device 13 into the main storage device 12 and executing the programs.

The auxiliary storage device 13 is a device that stores programs and data, and may be configured, for example, by a Solid State Drive (SSD), a hard disk drive, an optical storage device (Compact Disc (CD), Digital Versatile Disc (DVD), or the like), various types of storage systems such as Network Attached Storage (NAS), and the like, reading/writing devices for non-temporary recording media such as IC cards, SD cards, optical recording media, and the like, non-temporary storage areas of cloud servers, and the like. Programs and data can be read into the auxiliary storage device 13 from a non-temporary recording medium or another information processing device equipped with a non-temporary storage device via a recording medium reading device or a communication device 16. Programs and data stored in the auxiliary storage device 13 are read into the main storage device 12 at any time.

The input device 14 is an interface that receives input of information from the outside, and is, for example, a keyboard, a mouse, a touch panel, a card reader, a pen input type tablet, an audio input device, or the like.

The output device 15 is an interface that outputs various information such as processing progress and processing results to the outside. The output device 15 is, for example, a display device that visualizes the above various information (liquid crystal monitor, Liquid Crystal Display (LCD), graphic card, or the like), a device that converts the above various information into audio (audio output device (speaker, or the like)), a device that converts the above various information into text (printing device, or the like), and the like. Note that, for example, a configuration may be adopted in which the information processing device 10 inputs and outputs information to and from other devices via the communication device 16.

The input device 14 and the output device 15 constitute a user interface that achieves interaction processing (receiving information, providing information, and the like) with the user.

The communication device 16 is a device that achieves communication with other devices. The communication device 16 is a wired or wireless communication interface that achieves communication with other devices via the communication network 5, and includes, for example, a Network Interface Card (NIC), a wireless communication module, a USB module, and the like.

For example, an operating system, a file system, a Data-Base Management System (DBMS) (relational database, NoSQL, or the like), a Key-Value Store (KVS), or the like may be installed in the information processing device 10.

Although embodiments of the present invention have been described above in detail with reference to the drawings, the specific configuration is not limited to these embodiments, and may also include designs within the scope of the gist of the present invention.

REFERENCE SIGNS LIST

1 Distributed ledger system, 3 Distributed ledger node, 300 Storage unit, 302 Consortium information, 303 Participating member management information, 310 Distributed ledger, 311 Blockchain (BC), 312 State information, 313 Business SC, 314 Soundness management SC, 320 TX management unit, 325 Consensus management unit, 330 SC execution management unit, 335 Approved TX distribution unit, 340 TX issuing unit, 345 Node search unit, 350 Member management unit, 355 Communication unit, 4 Client node, 400 Storage unit, 401 Node search information, 420 TX issuing unit, 425 Node search unit, 430 Business application, 435 Monitoring agent, 511 Soundness report, 512 Soundness cross-verification, 513 Configuration compliance status verification, 514 Action instruction, 515 Organization reliability calculation, 516 Monitoring organization selection, 517 Various data reference, 551 Soundness monitoring method definition, 552 Soundness monitoring result, 553 Soundness verification result, 554 Configuration design information, 555 Configuration compliance status, 556 Capacity information, 557 Organization reliability, 558 Monitoring organization, S700 Member registration process, S800 SC deployment/execution process, S900 Soundness report process, S1000 Soundness cross-verification process, S1100 Configuration compliance status verification process, S1150 Action process, S1200 Reliability calculation process, S1300 Monitoring organization selection process, 1400 Soundness information providing screen

The invention claimed is:

1. A distributed ledger system, comprising:
a distributed ledger network configured by a distributed ledger node provided by each of a plurality of organizations, the distributed ledger network configured to execute a smart contract according to a transaction,
wherein the smart contract:
manages information in a distributed ledger while building consensus among the distributed ledger nodes of the plurality of organizations;
receives a soundness monitoring result that is information acquired by a first organization that is monitoring soundness of the distributed ledger node of a second organization;
verifies the soundness of the distributed ledger node of the second organization by verifying the received soundness monitoring result; and
records a soundness verification result that is a result of verifying the soundness, in the distributed ledger,
wherein the distributed ledger records configuration design information that is information indicating a configuration of the distributed ledger node to be prepared and provided by each of the organizations, the configuration design information includes information indicating, for each organization, a number of nodes to prepare and provide, hardware specifications for each node, software specifications for each node, and information indicating the functions performed by each node, and
wherein the smart contract:
generates a configuration compliance status that is information indicating a degree to which the organization complies with the configuration design information by comparing and contrasting the soundness verification result of the second organization with the configuration design information of the second organization; and records the generated configuration compliance status in the distributed ledger.

2. The distributed ledger system according to claim 1, wherein the smart contract determines whether the configuration compliance status of the second organization satisfies the configuration design information, and in a case where the configuration design information is not satisfied, the smart contract records, in the distributed ledger, information instructing the second organization to review a configuration of the distributed ledger node, or information instructing a third organization to prepare a distributed ledger node on behalf of the second organization.

3. The distributed ledger system according to claim 1, wherein the smart contract determines whether the configuration compliance status of the second organization satisfies the configuration design information, and in a case where the configuration design information is not satisfied, the smart contract records, in the distributed ledger, information indicating that a penalty is to be imposed on the second organization due to an insufficient configuration of the distributed ledger node.

4. The distributed ledger system according to claim 1, wherein the smart contract generates organization reliability that is reliability of each of the plurality of organizations based on the configuration compliance status, and records the generated organization reliability of each of the plurality of organizations in the distributed ledger.

5. The distributed ledger system according to claim 1, wherein the smart contract generates organization reliability that is reliability of each of the plurality of organizations based on the soundness monitoring result of each of the plurality of organizations, and records the generated organization reliability in the distributed ledger.

6. The distributed ledger system according to claim 5, wherein the smart contract determines a monitoring organization that is the organization responsible for monitoring the distributed ledger node of each of the plurality of organizations, based on the organization reliability, and records information indicating the determined monitoring organization in the distributed ledger.

7. The distributed ledger system according to claim 1, wherein the distributed ledger records a soundness monitoring method definition that is information indicating a monitoring method used when the organization monitors the soundness of the distributed ledger node of the second organization, and the smart contract, based on at least one of a smart contract consensus condition, a soundness determination criterion included in the soundness monitoring method definition, and the soundness monitoring result, selects a monitoring organization that is the organization responsible for monitoring the distributed ledger node of each of the plurality of organizations, and records information indicating the selected monitoring organization in the distributed ledger.

8. The distributed ledger system according to claim 1, wherein the smart contract, according to the configuration compliance status of the organization, records, in the distributed ledger, information indicating weighting when selecting a monitoring organization that is the organization responsible for monitoring the distributed ledger node of the second organization.

9. The distributed ledger system according to claim 1, further comprising:
a plurality of client nodes that are communicatively connected to the distributed ledger node that each of the plurality of organizations has,
wherein the client node of the first organization:
monitors the soundness of the distributed ledger node of the second organization;
generates the transaction including the soundness monitoring result obtained by the monitoring; and
transmits the generated transaction to the distributed ledger node.

10. The distributed ledger system according to claim 9, wherein the distributed ledger records a soundness monitoring method definition that is information indicating a monitoring method used when the organization monitors the soundness of the distributed ledger node of the second organization, and
the client node monitors soundness of the second organization according to the monitoring method defined by the soundness monitoring method definition.

11. The distributed ledger system according to claim 9, wherein the client node monitors the soundness of the distributed ledger node of the second organization by checking whether the distributed ledger node is alive or dead using a service discovery function.

12. A control method for a distributed ledger system, the distributed ledger system including a distributed ledger node provided by each of a plurality of organizations, the control method comprising:
providing a distributed ledger network composed of the plurality of distributed ledger nodes; and
executing smart contracts according to transactions received from outside,
wherein the smart contract manages information in the distributed ledger while building consensus among the distributed ledger nodes of the plurality of organizations, and executes:
a step of receiving a soundness monitoring result that is information acquired by a first organization that is monitoring soundness of the distributed ledger node of a second organization;
a step of verifying the soundness of the distributed ledger node of the second organization by verifying the received soundness monitoring result; and
a step of recording a soundness verification result that is a result of verifying the soundness, in the distributed ledger,
wherein the distributed ledger records configuration design information that is information indicating a configuration of the distributed ledger node to be prepared and provided by each of the organizations, the configuration design information includes information indicating, for each organization, a number of nodes to prepare and provide, hardware specifications for each node, software specifications for each node, and information indicating the functions performed by each node, and
wherein the smart contract:
generates a configuration compliance status that is information indicating a degree to which the organization complies with the configuration design information by comparing and contrasting the soundness verification result of the second organization with the configuration design information of the second organization; and records the generated configuration compliance status in the distributed ledger.

13. The control method for a distributed ledger system according to claim 12, further comprising:

a step of determining, by the smart contract, whether the configuration compliance status of the second organization satisfies the configuration design information, and in a case where the configuration design information is not satisfied, recording, in the distributed ledger, information instructing the second organization to review a configuration of the distributed ledger nodes.

\* \* \* \* \*